(12) United States Patent
Packirisamy et al.

(10) Patent No.: US 8,883,080 B2
(45) Date of Patent: Nov. 11, 2014

(54) NANO-ENHANCED EVANESCENCE INTEGRATED TECHNIQUE (NEET) BASED MICROPHOTONIC DEVICE AND SAMPLE ANALYSIS SYSTEM

(75) Inventors: Muthukumaran Packirisamy, Pierrefonds (CA); Arvind Chandrasekaran, Montreal (CA)

(73) Assignee: Concordia University, Montreal (CA)

( * ) Notice: Subject to any disclaimer, the term of this patent is extended or adjusted under 35 U.S.C. 154(b) by 232 days.

(21) Appl. No.: 13/395,384

(22) PCT Filed: Sep. 16, 2010

(86) PCT No.: PCT/CA2010/001429
§ 371 (c)(1),
(2), (4) Date: Jun. 13, 2012

(87) PCT Pub. No.: WO2011/032268
PCT Pub. Date: Mar. 24, 2011

(65) Prior Publication Data
US 2012/0269683 A1    Oct. 25, 2012

Related U.S. Application Data

(60) Provisional application No. 61/242,858, filed on Sep. 16, 2009.

(51) Int. Cl.
*G01N 21/00* (2006.01)
*G02B 6/00* (2006.01)
*G02B 6/122* (2006.01)
*B82Y 20/00* (2011.01)

(52) U.S. Cl.
CPC ............... *G02B 6/1225* (2013.01); *B82Y 20/00* (2013.01)
USPC ......................................... 422/82.11; 385/12

(58) Field of Classification Search
CPC .................... G01N 21/7703; G01N 33/54373; G01N 21/648; G01N 21/553
USPC ....................................................... 422/82.11
See application file for complete search history.

(56) References Cited

U.S. PATENT DOCUMENTS

| 2002/0110839 A1* | 8/2002 | Bach et al. ...................... 435/7.9 |
| 2006/0068412 A1* | 3/2006 | Tang ................................. 435/6 |
| 2009/0142790 A1* | 6/2009 | Fang et al. ....................... 435/29 |
| 2009/0245718 A1* | 10/2009 | Li et al. ............................ 385/12 |

OTHER PUBLICATIONS

Chandrasekaran, A. et al, "MOEMS based integrated microfluidic fiber-optic waveguides for Biophotonic applications", Proceedings of SPIE, vol. 5969, pp. 178-186.

(Continued)

*Primary Examiner* — Jill Warden
*Assistant Examiner* — Brittany Fisher
(74) *Attorney, Agent, or Firm* — Senniger Powers LLP

(57) ABSTRACT

A device, a method of fabricating the device and a sample analysis system that includes the device are provided. The device includes an optical waveguide having a plurality of nanofeatures integrated thereon to influence at least one of evanescence and coupling of an optical field of the optical waveguide. The sample analysis system includes a fluidic actuation system for introducing sample specimen fluid into a microfluidic channel of the device for evanescence based detection.

20 Claims, 20 Drawing Sheets

(56) References Cited

OTHER PUBLICATIONS

Chandrasekaran, A. et al, "Hybrid bulk micro-machining process suitable for roughness reduction in optical MEMS devices", International Journal of Manufacturing Technology and Management, vol. 9, n 1-2, pp. 144-159.

Haesun, Baek K. et al, "Elementary Steps in the Formation of Horseradish Peroxidase Compound I: Direct Observation of Compound 0, a New Intermediate with a Hyperporphyrin Spectrum", Biochemistry 1989, 28(57), pp. 5714-5719.

Masaru, Akita et al, "Structural Change and Catalytic Activity of Horseradish Peroxidase in Oxidative Polymerization of Phenol", Biosciences, Biotechnology and Biochemistry, 65(7), pp. 1581-1588.

Ong, Biowl-liem, "Adjustable refractive index modulation for a waveguide with SU-8 photoresist by dual-UV exposure lithography", Applied Optics, vol. 45, pp. 8036-8039, 2006.

Rong, Guoguang et al, "Label-free porous silicon membrane waveguide for DNA sensing", Applied Physics Letters—Lasers, Optics and Optoelectronics, vol. 93, issue 16, 3 pages, Oct. 2008.

Fujimaki, Makoto et al, "Silica-based monolithic sensing plates for waveguide-mode sensors", Optics Express, vol. 16, No. 9, 9 pages, Apr. 2008.

Gopinath, Subash C.B. et al, "Monitoring surface-assisted biomolecular assembly by means of evanescent-field-coupled waveguide-mode nanobiosensors", Analytical and Bioanalytical Chemistry, vol. 394, issue 2, pp. 481-488, Mar. 2009.

Rong, Guoguang et al, "Biomolecule size-dependent sensitivity of porous silicon sensors", physica status solidi (a), vol. 206, issue 6, pp. 1365-1368, Jun. 2009.

Lee, S.J. et al., "Micro total analysis system (MU-TAS) in biotechnology", Applied Microbiology Biotechnology, vol. 64, Issue 3, pp. 289-299, Apr. 2004.

Mandal, Sudeep et al., "Nanoscale optofluidic sensor arrays", Optics Express, vol. 16 ,No. 3, pp. 1623-1631, 2008.

Sirbuly, Donald J., et al., "Multifunctional Nanowire Evanescent Wave Optical Sensors", Advanced Materials, vol. 19, Issue 1, pp. 61-66, 2007.

\* cited by examiner

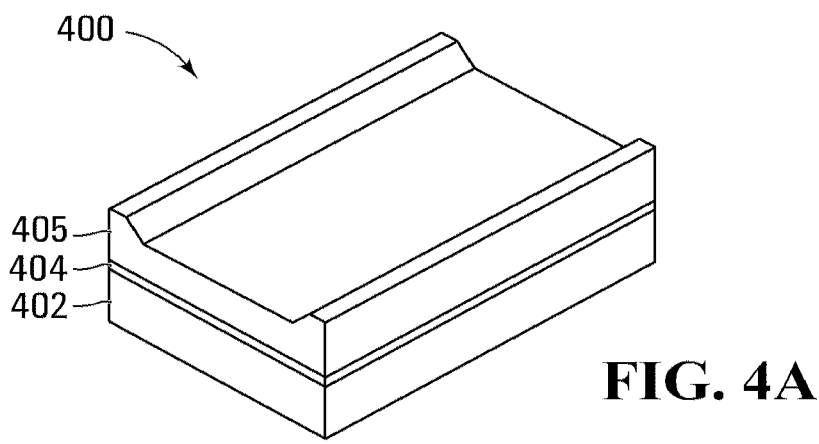
FIG. 4A
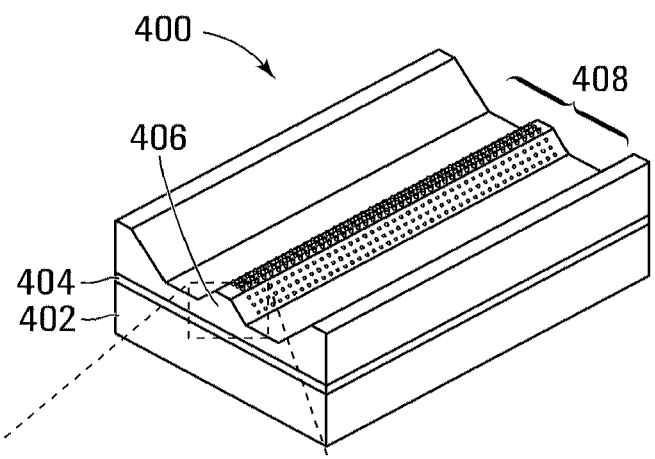
FIG. 4B
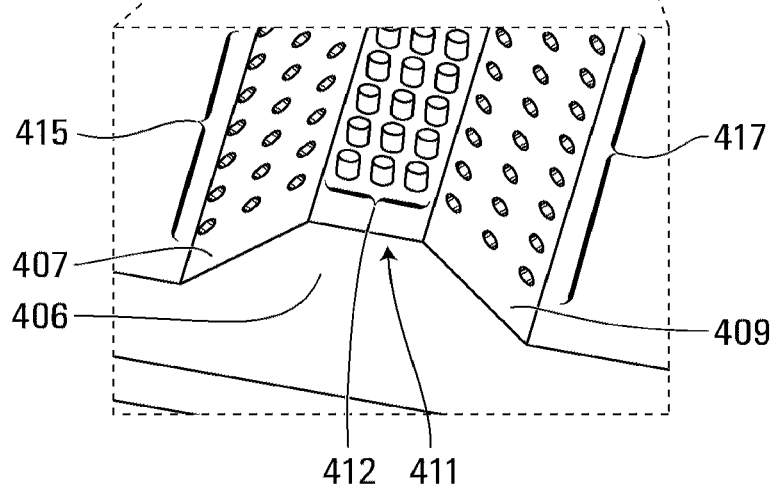

NANO-ENHANCED EVANESCENCE INTEGRATED TECHNIQUE (NEET) BASED MICROPHOTONIC DEVICE AND SAMPLE ANALYSIS SYSTEM

REFERENCE TO RELATED APPLICATIONS

This application claims the benefit of and is a National Phase Entry of International Application No. PCT/CA2010/001429 filed Sep. 16, 2010, and claims the benefit of prior U.S. Provisional Application No. 61/242,858 filed Sep. 16, 2009, which are hereby incorporated by reference in their entirety.

FIELD OF THE INVENTION

The present invention relates to microphotonic devices, and more specifically to optical waveguide based devices suitable for use as biophotonic sensors.

BACKGROUND

Point-Of-Care Testing (POCT) and in-situ solutions to medical diagnosis and biochemical detections are used for early and rapid identification of target specimens.

Biophotonic sensors integrated with complementary Micro-ElectroMechanical Systems (MEMS) integrate optics with biological testing/manipulation for efficient and rapid bio-sensing, thus realizing the concept of Lab-on-a-Chip (LOC) or Micro-Total Analysis Systems (µTAS). However, for the sake of convenience and the ability to handle smaller sample volumes of chemical and biological species, there are some issues associated with conventional biophotonic based bio-sensing systems, such as miniaturization and portability, that have hindered their integration in LOC and µTAS applications.

Silicon waveguide-based biophotonic sensors have been previously contemplated due to the fact that silicon waveguides can be miniaturized to the order of microns to a few nanometers in order to achieve single mode conditions for wave propagation. The potential commercial advantages of using silicon based platforms are cost effectiveness and ease of microfabrication. However, silicon based platforms typically have two potential drawbacks that can affect bio-sensor systems, namely, problems with miniaturization and secondly, the typically high material absorption properties of silicon in the optical spectra that are generally used for bio-sensing, such as the visible and infrared spectra.

SUMMARY OF THE INVENTION

One aspect of the present invention provides a device comprising an optical waveguide having a plurality of nanofeatures integrated thereon to influence at least one of evanescence and coupling of an optical field of the optical waveguide.

In some embodiments, at least some of the plurality of nanofeatures have a different or same refractive index as that of any layer of the optical waveguide.

In some embodiments, the plurality of nanofeatures are formed such that they increase surface binding of bio-specimens on the optical waveguide.

In some embodiments, the optical waveguide is substantially transparent to light in the visible spectrum.

In some embodiments, the optical waveguide is substantially transparent to light in the infrared spectrum.

In some embodiments, the nanofeatures comprise at least one of: nanoparticles, nanopillars, nanocavities, nanotubes, nanorods, nanofilms, nanocolloids, nanostructures and nanospheres.

In some embodiments, the plurality of nanofeatures comprises at least one row of nanofeatures arranged substantially transverse to a direction of propagation of light through the optical waveguide.

In some embodiments, the nanofeatures in the at least one row are spaced apart by an equal distance.

In some embodiments, the nanofeatures in the at least one row are randomly distributed.

In some embodiments, the at least one row of nanofeatures comprises a plurality of rows of nanofeatures, the plurality of rows being equally spaced apart along a length of the optical waveguide.

In some embodiments, the at least one row of nanofeatures comprises a plurality of rows of nanofeatures, the plurality of rows being randomly distributed apart along a length of the optical waveguide.

In some embodiments, the plurality of nanofeatures comprises nanofeatures of varied sizes and/or shapes.

In some embodiments, the optical waveguide comprises an optical rib waveguide having a first side wall, a second side wall opposite the first side wall and a top side wall joining the first side wall and the second side wall.

In some embodiments, an angle of inclination of the first side wall and the second side wall of the optical rib waveguide is less than 90 degrees.

In some embodiments, the first side wall is inclined to the second side wall.

In some embodiments, the plurality of nanofeatures are integrated partially or fully onto at least one of the first side wall, the second side wall and the top side wall of the optical rib waveguide.

In some embodiments, the device is fabricated on Silicon, Silica, Silicon-On-Insulator (SOI), InP, GaAs, Poly dimethylsiloxane (PDMS), Poly Methyl Methacrylate (PMMA), SU8, other optical polymers and materials, or a combination thereof.

In some embodiments, the plurality of nanofeatures are fabricated by one or more micro fabrication techniques selected from the group consisting of: Plasma Enhanced Chemical Vapor Deposition (PECVD), Chemical Vapor Deposition (CVD), Deposition techniques, Etching, Chemical Synthesis, Colloidal growth, adsorption, dip coating, spin coating, spray coating, lithography, and other top-down and bottom-up approaches.

In some embodiments, the device further comprises a microfluidic channel in contact with the optical waveguide.

In some embodiments, the microfluidic channel is in contact with two or more sides of the optical waveguide.

In some embodiments, each side of the optical waveguide in contact with the microfluidic channel has nanofeatures of the plurality of nanofeatures integrated thereon.

In some embodiments, the device further comprises a seal top defining a bound of the microfluidic channel.

In some embodiments, the seal top comprises: an inlet port for delivery of a sample specimen fluid into the microfluidic channel; and an outlet port for removal of the sample specimen fluid from the microfluidic channel.

In some embodiments, the seal top comprises an optically transparent material.

In some embodiments, the microfluidic channel comprises a plurality of microfluidic channels.

In some embodiments, the plurality of microfluidic channels comprises at least two microfluidic channels having different configurations.

Another aspect of the present invention provides a sample analysis system comprising a device in accordance with the first aspect of the present invention and a fluidic actuation system for introducing sample specimen fluid into the microfluidic channel.

In some embodiments, the sample specimen fluid comprises a chemical or biological specimen.

In some embodiments, the fluidic actuation system comprises valves for the control of fluid flow through the system.

In some embodiments, the fluidic actuation system comprises a mechanical micropump for fluid actuation.

In some embodiments, the fluidic actuation system comprises a non-mechanical micropump for fluid actuation.

In some embodiments, the mechanical micropump comprises at least one of: a) an electrostatic actuated pump; b) a piezoelectric actuated pump; c) a thermal actuated micropump; d) pressure actuated micropump; e) electromagnetic micropump; and f) Other active polymer based micropump.

In some embodiments, the fluidic actuation system comprises a digital microfluidic system for fluidic actuation.

In some embodiments, the digital microfluidic system comprises at least one of: an electro-osmotic system, an electrophoretic system, and a di-electrophoretic system.

In some embodiments, the fluidic actuation system comprises a combination of mechanical and digital microfluidic systems for fluidic actuation.

In some embodiments, the sample analysis system further comprises provisions for connecting the microfluidic channel of the device to external fluidic circuitry.

In some embodiments, the sample analysis system is integrated in a Lab-on-a-Chip (LOC) application or a Micro-Total Analysis System (μTAS) application.

In some embodiments, the device is integrated on a common platform with at least one other optical device selected from the group consisting of a light absorbance sensor, a fluorescence spectroscopy sensor, a surface plasmon resonance sensor, and a scattering sensor.

In some embodiments, the sample analysis system further comprises: a light source for inputting light into an input end of the optical waveguide; and a spectrum analyzer for determining an insertion loss of the optical waveguide.

Yet another aspect of the present invention provides a method of fabricating a device, the method comprising: microfabricating an optical waveguide on a semiconductor material platform; and microfabricating a plurality of nanofeatures on at least one surface of the optical waveguide to influence at least one of evanescence and coupling of an optical field of the optical waveguide.

In some embodiments, microfabricating a plurality of nanofeatures on at least one surface of the optical waveguide comprises microfabricating at least some of the plurality of nanofeatures with a material having a different or same refractive index as that of any layer of the optical waveguide.

In some embodiments, microfabricating a plurality of nanofeatures on at least one surface of the optical waveguide comprises microfabricating the plurality of nanofeatures such that they increase surface binding of bio-specimens on the optical waveguide.

In some embodiments, microfabricating the optical waveguide comprises microfabricating the optical waveguide from a material that is substantially transparent to light in the visible spectrum.

In some embodiments, microfabricating the optical waveguide comprises microfabricating the optical waveguide from a material that is substantially transparent to light in the infrared spectrum.

In some embodiments, microfabricating a plurality of nanofeatures on at least one surface of the optical waveguide comprises microfabricating at least one of: nanoparticles, nanopillars, nanocavities, nanotubes, nanorods, nanofilms, nanocolloids, nanostructures and nanospheres, on the at least one surface of the optical waveguide.

In some embodiments, microfabricating a plurality of nanofeatures on at least one surface of the optical waveguide comprises microfabricating at least one row of nanofeatures arranged substantially transverse to a direction of propagation of light through the optical waveguide.

In some embodiments, microfabricating at least one row of nanofeatures arranged substantially transverse to a direction of propagation of light through the optical waveguide comprises microfabricating the nanofeatures in the at least one row such that they are spaced apart by an equal distance.

In some embodiments, microfabricating at least one row of nanofeatures arranged substantially transverse to a direction of propagation of light through the optical waveguide comprises microfabricating the nanofeatures in the at least one row such that they are randomly distributed.

In some embodiments, microfabricating at least one row of nanofeatures arranged substantially transverse to a direction of propagation of light through the optical waveguide comprises microfabricating a plurality of rows of nanofeatures, the plurality of rows being equally spaced apart along a length of the optical waveguide.

In some embodiments, microfabricating at least one row of nanofeatures arranged substantially transverse to a direction of propagation of light through the optical waveguide comprises microfabricating a plurality of rows of nanofeatures, the plurality of rows being randomly distributed apart along a length of the optical waveguide.

In some embodiments, microfabricating a plurality of nanofeatures comprises microfabricating a plurality of nanofeatures of varied sizes and/or shapes.

In some embodiments, microfabricating the optical waveguide comprises microfabricating an optical rib waveguide having a first side wall, a second side wall opposite the first side wall and a top side wall joining the first side wall and the second side wall.

In some embodiments, microfabricating an optical rib waveguide comprises microfabricating the optical rib waveguide such that an angle of inclination of the first side wall and the second side wall of the optical rib waveguide is less than 90 degrees.

In some embodiments, microfabricating a plurality of nanofeatures on at least one surface of the optical waveguide comprises microfabricating the plurality of nanofeatures on at least one of the first side wall, the second side wall and the top side wall of the optical rib waveguide.

In some embodiments, the semiconductor material platform comprises Silicon, Silica, Silicon-On-Insulator (SOI), InP, GaAs, Poly dimethylsiloxane (PDMS), Poly Methyl Methacrylate (PMMA), SU8, other optical polymers and materials, or a combination thereof.

In some embodiments, microfabricating the plurality of nanofeatures comprises microfabricating the plurality of nanofeatures using at least one micro fabrication technique selected from the group consisting of: Plasma Enhanced Chemical Vapor Deposition (PECVD), Chemical Vapor Deposition (CVD), Deposition techniques, Etching, Chemical Synthesis Colloidal growth, adsorption, dip coating, spin coating, spray coating, lithography, and other top-down and bottom-up approaches.

In some embodiments, the method further comprises microfabricating a microfluidic channel on the semiconductor material platform such that the microfluidic channel is in contact with the optical waveguide.

In some embodiments, microfabricating the microfluidic channel comprises microfabricating the microfluidic channel such that it is in contact with two or more sides of the optical waveguide.

In some embodiments, microfabricating the microfluidic channel and the plurality of nanofeatures comprises microfabricating the microfluidic channel and the plurality of nanofeatures such that each side of the optical waveguide that is in contact with the microfluidic channel has nanofeatures of the plurality of nanofeatures integrated thereon.

In some embodiments, the method further comprises bonding a seal top to the device such that the seal top defines a bound of the microfluidic channel.

In some embodiments, bonding a seal top to the device comprises bonding a seal top to the device that comprises: an inlet port for delivery of a sample specimen fluid into the microfluidic channel; and an outlet port for removal of the sample specimen fluid from the microfluidic channel.

In some embodiments, the seal top comprises an optically transparent material.

In some embodiments, microfabricating the microfluidic channel comprises microfabricating a plurality of microfluidic channels on the semiconductor material platform such that the plurality of microfluidic channels are in contact with the optical waveguide.

In some embodiments, microfabricating a plurality of microfluidic channels comprises microfabricating at least two microfluidic channels having different configurations.

Yet another aspect of the present invention provides for use of a sample analysis system as described herein for evanescence based detection.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying drawings, in which:

FIG. 4A is a perspective view of a triple bound SOI NEET based waveguide system after a first step of fabrication in accordance with an embodiment of the present invention;

FIG. 4B is a perspective view of the triple bound SOI NEET based waveguide system shown in FIG. 4A after a second step of fabrication in accordance with an embodiment of the present invention;

In the drawings, when the same part is illustrated in multiple figures, the same reference numeral is used to identify it.

DETAILED DESCRIPTION

Figure 1A:
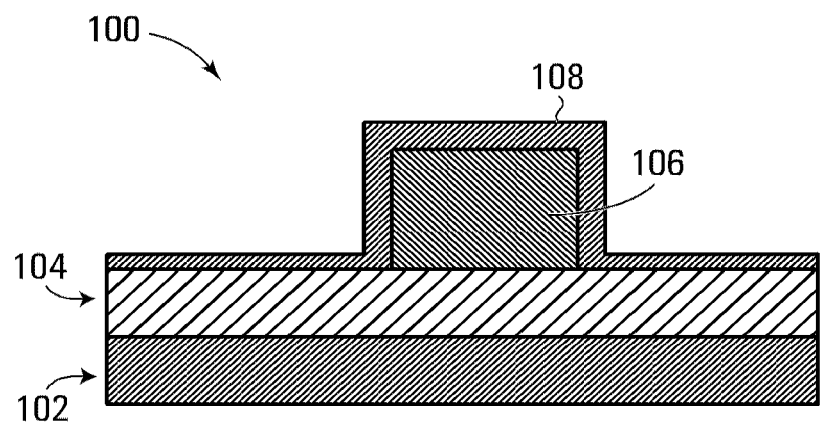
FIG. 1A is a cross-sectional view of an optical waveguide implemented on a silica-on-silicon (SOS) platform.

In the following detailed description of sample embodiments, reference is made to the accompanying drawings, which form a part hereof, and in which is shown by way of illustration specific sample embodiments in which the present invention may be practiced. These embodiments are described in sufficient detail to enable those skilled in the art to practice the invention, and it is to be understood that other embodiments may be utilized and that logical, mechanical, electrical, and other changes may be made without departing from the scope of the invention. The following detailed description is, therefore, not to be taken in a limiting sense, and the scope is defined by the appended claims.

Various technical references are referred to herein using numerals in square brackets, [ ]. A complete citation for each of these references is provided at the end of the application.

Embodiments of the present invention provide a Nano Enhanced Evanescence-integrated Technique (NEET) based microphotonic sensor system operable in optical spectra such as the visible spectra and infrared (IR) spectra. Some embodiments of the system apply the principle of NEET through bio-optical interaction of light guided through an optical waveguide for chemical and biosensing applications. The NEET system is employed through the integration of nanofeatures, such as nanoparticles, nanotubes, nanospheres, nanocavities, nanospheres, etc. in order to influence the evanescence and/or coupling of an optical field and in some embodiments improve sensing efficiency.

With suitable integration of microfluidics [1], some embodiments of the present invention provide a micro-nano integrated NEET sensing system for applications in Lab-on-a-Chip and Micro-Total Analysis Systems for the detection and quantification of active chemical and biological target specimen present in a given analyte. Some embodiments of the present invention are fabricated in different material platforms, such as, for example, Silicon, GaAs, InP, Polymers such as SU-8, Poly Dimethyl Siloxane (PDMS), Poly Methyl Methacrylate (PMMA). Hence, embodiments of the present invention may provide a technique for biological and chemical sensing in the visible and infrared wavelength range of light, so that the advantages of semiconductor technologies, such as silicon fabrication techniques, may be realized.

Some embodiments of the present invention provide a fully integrated Micro-Total Analysis System on a silicon platform. Embodiments of the present invention exploit the principle of detecting bio-optical interactions through Nano-Enhanced Evanescence (NEE). In at least some cases, the bio-interaction or chemical reaction is allowed to occur near the nano-evanescent field zone of the waveguide so that the optical properties of the medium around the core is strongly influenced by the time-variant interactions, which will in turn influence the evanescent field depending upon the geometry and the optical properties of the NEET based system. Depending upon the number of side walls of the waveguide that are integrated with nano-evanescent promoters through NEET, it is possible to influence the evanescence accordingly.

Some embodiments of the present invention enhance the sensing capabilities of the presently available biosensor devices with NEET integration for visible/Infrared wavelength range of the optical spectrum.

Figure 1B:
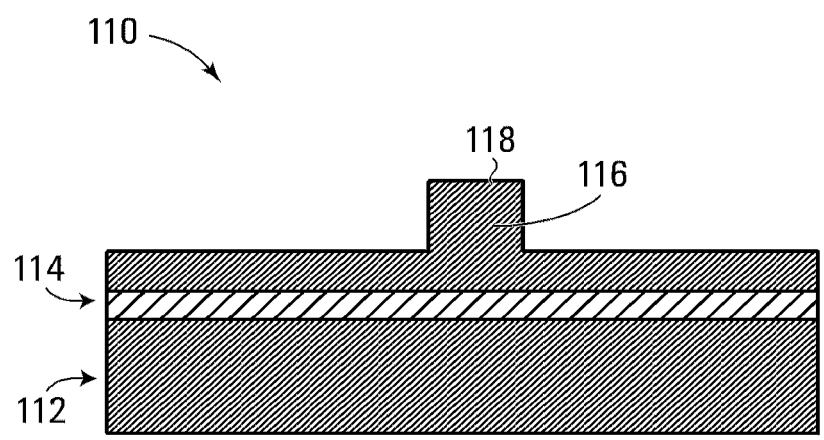
FIG. 1B is a cross-sectional view of an optical waveguide implemented on a silicon-on-insulator (SOI) platform.

FIGS. 1A and 1B show the schematic cross-sectional representations of both Silica-on-Silicon (FIG. 1A) and Silicon-on-Insulator (FIG. 1B) waveguide systems. The Silica-on-Silicon waveguide system 100 shown in FIG. 1A is fabricated on a silicon substrate 102. The silicon substrate 102 has an underclad buffer layer 104 over top of it. A silica core waveguide 106 is formed over the underclad buffer layer 104 and an overclad layer 108 is formed over the silica core waveguide 106 and the underclad buffer layer 104. The silicon-on-insulator waveguide system 110 shown in FIG. 1B includes a handle layer 112, a buried oxide layer 114 over top of the handle layer 112, a silicon waveguide core 116 formed over the buried oxide layer 114 and a cladding layer 118 formed over the silicon waveguide core 116.

The silica core waveguide 106 shown in FIG. 1A and the silicon waveguide 116 shown in FIG. 1B are implemented as rib waveguides having two sidewalls and a top side wall joining the two sidewalls. Nanofeatures, in accordance with an embodiment of the present invention may be included on one or more of the side walls to increase evanescence of light passed through the waveguide system 100,110.

Figure 2A:
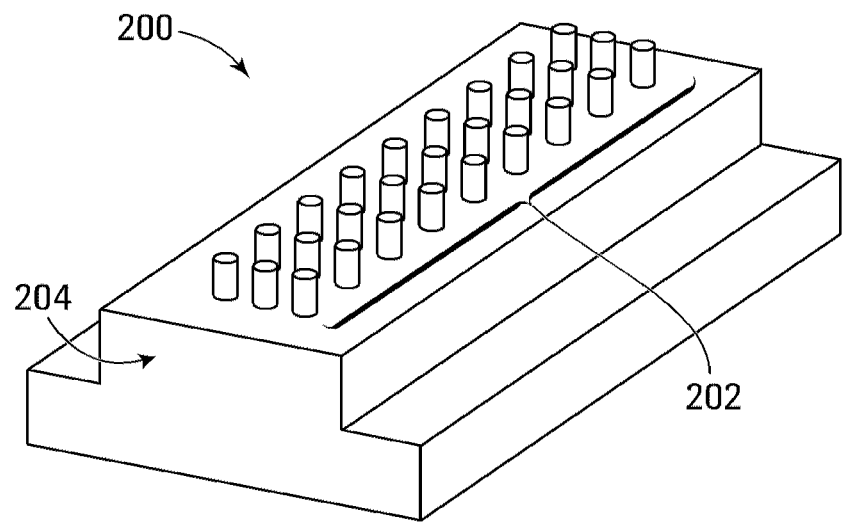
FIG. 2A is a perspective view of a rib waveguide having nanopillars incorporated thereon in accordance with an embodiment of the present invention.
Figure 2B:
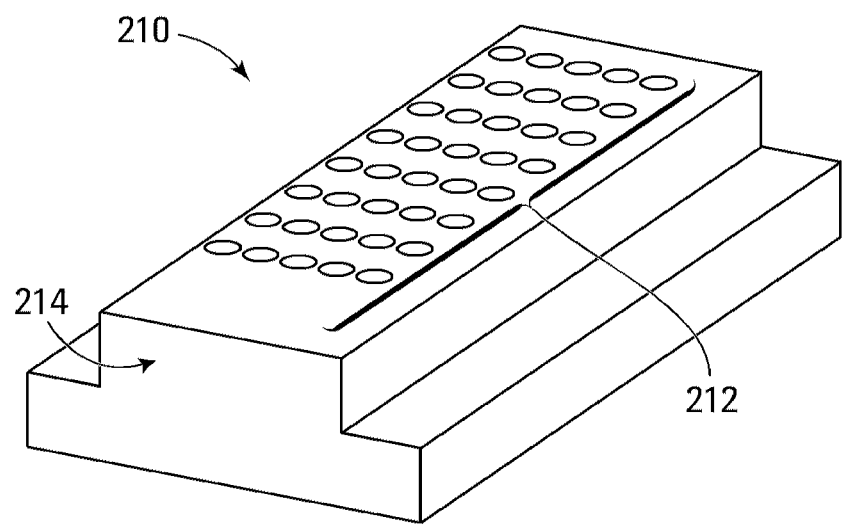
FIG. 2B is a perspective view of a rib waveguide having nanocavities incorporated thereon in accordance with an embodiment of the present invention.

For example, FIG. 2A and FIG. 2B are perspective views of NEET based waveguide systems 200 and 210 respectively having nanofeatures included on the top side wall of a rib waveguide. In FIG. 2A, the nanofeatures are implemented as a plurality of nanopillars 202 arranged in ordered rows along a length of the rib waveguide 204, whereas in FIG. 2A the nanofeatures are implemented as ordered rows of nanocavities 212 arranged along the length of the rib waveguide 214.

The dimensions of the nanofeatures are an implementation specific detail that depends upon the operating parameters of a NEET based waveguide system in which a waveguide based device in accordance with an embodiment of the present invention, is to be incorporated. In some embodiments, the dimensions of a nanofeature are in the order of not more than $1/10^{th}$ of the waveguide dimensions.

A sequential fabrication method of a NEET based SOI platform for mono-tropic and dual bound evanescent systems will now be described with reference to FIGS. 3A to 3D.

Figure 3A:
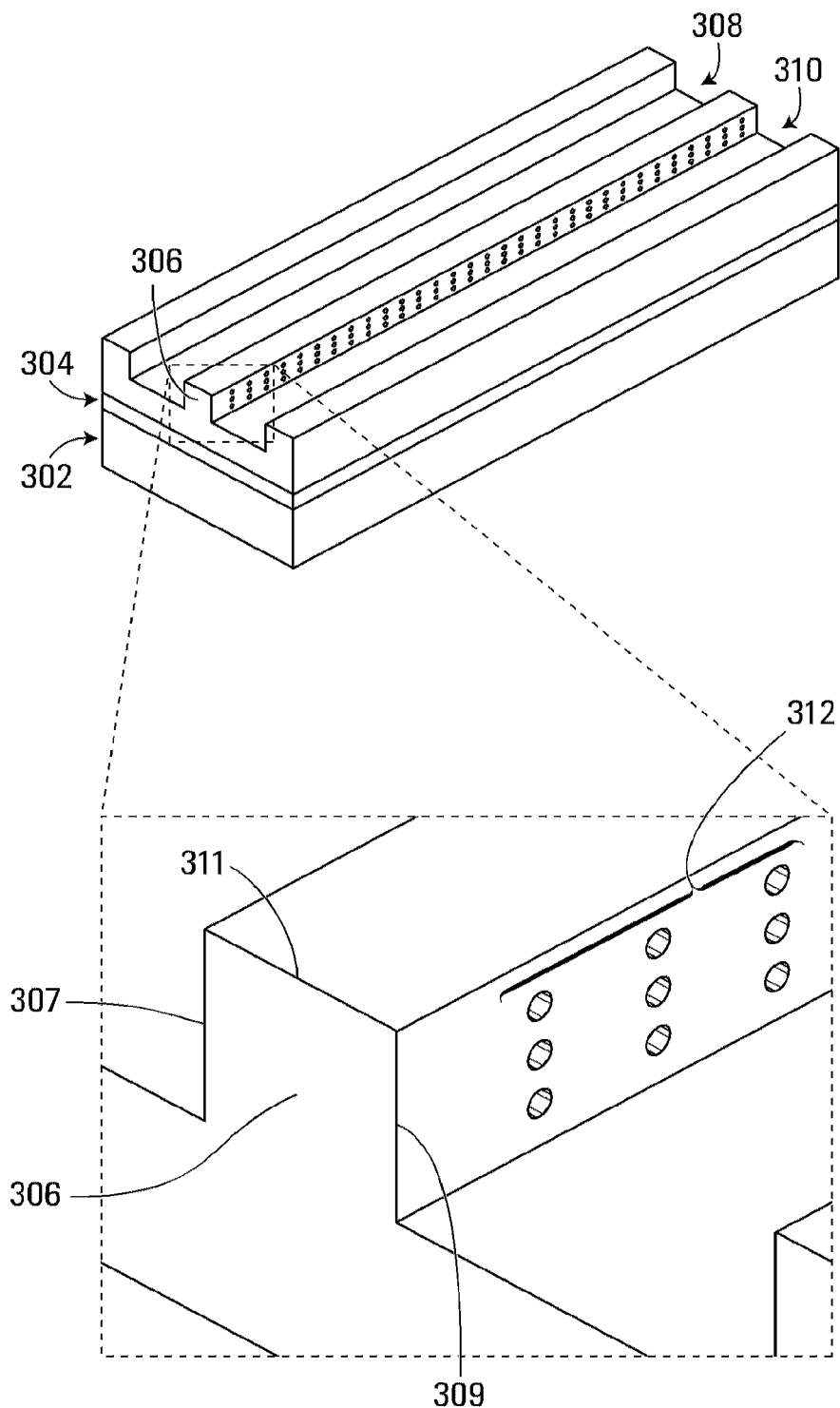
FIG. 3A is a perspective view of a SOI NEET based waveguide system in accordance with an embodiment of the present invention.

FIG. 3A is a perspective view of a SOI NEET based waveguide system 300. Waveguide system 300 includes a silicon substrate 302, a buried oxide layer 304 and a silicon rib waveguide 306, arranged in a layered manner. On either side of the rib waveguide 306 are formed microfluidic channels 308 and 310 respectively. The rib waveguide 306 includes a left side wall 307, a right side wall 309 and a top side wall 311. A close up of the end of the waveguide 306 is shown in a cut out, which shows a plurality of nanofeatures incorporated on the right side wall 309 of the rib waveguide 306. Additional nanofeatures (not shown) may also be provided on the left side wall 307 of the silicon rib waveguide 306. In FIG. 3A the plurality of nanofeatures provided on the right side wall 309 of the silicon rib waveguide 306 include a plurality of nano-cavities 312. The plurality of nanofeatures provided on the left side wall 307 of the silicon rib waveguide 306 may be the same type or of a different type than those provided on the right side wall 309. More generally, any type of nanofeature or combination of more than one type of nanofeature that affects evanescence of the waveguide may be used in embodiments of the present invention. Furthermore, in some embodiments, nanofeatures are only provided on one side wall 307, 309 or 311 of the silicon rib waveguide 306.

In some embodiment, standard microfabrication techniques, such as Deep Reactive Ion Etching, Isotropic etching, etc., are used to fabricate the waveguide structure of FIG. 3A.

Figure 3B:
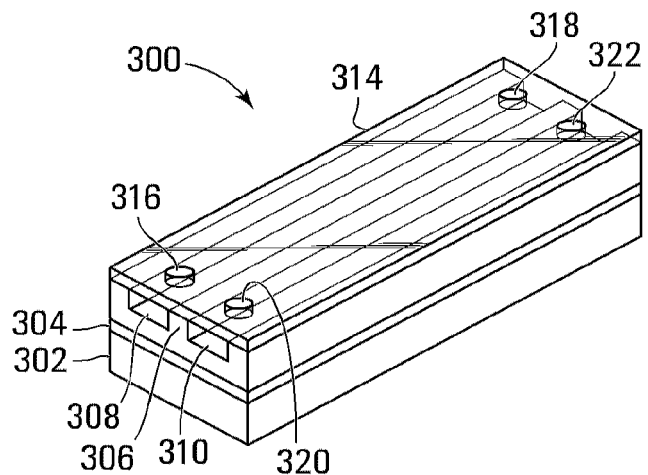
FIG. 3B is a perspective view of the SOI NEET based waveguide system shown in FIG. 3A having a seal-top incorporated thereon in accordance with an embodiment of the present invention.

FIG. 3B is a perspective view of the SOI NEET based waveguide system 300 shown in FIG. 3A having a seal-top 314 incorporated thereon in accordance with an embodiment of the present invention. The seal-top 314 includes a first inlet port 316 and a first outlet port 318 arranged for fluidic communication with the first microfluidic channel 308, and a second inlet port 320 and a second outlet port 322 arranged for fluidic communication with the second microfluidic channel 310.

In some embodiments the seal-top is made of a transparent material such as Polycarbonate, Pyrex, PDMS, PMMA, SU8, other optical polymer materials, etc.

Figure 3C:
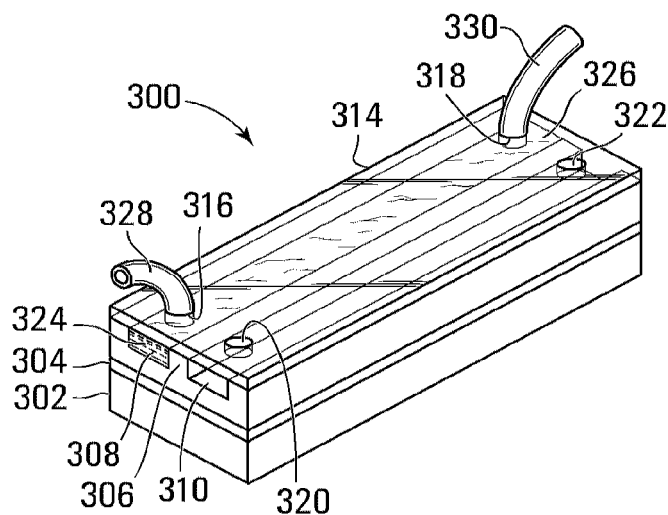
FIG. 3C is a perspective view of the SOI NEET based waveguide system shown in FIG. 3B having a pair of fluidic tubes inserted through an inlet port and an outlet port of the seal-top in accordance with an embodiment of the present invention.

FIG. 3C is a perspective view of the SOI NEET based waveguide system shown in FIG. 3B having a pair of fluidic tubes 328 and 330 inserted through the first inlet port 316 and the first outlet port 318 respectively of the seal-top 314 in accordance with an embodiment of the present invention. Also, ends 324 and 326 of the first microfluidic channel 308 are sealed so that fluid introduced through the microfluidic tube 328 will flow through the first microfluidic channel 308 and out through the microfluidic tube 330, or vice versa. In some embodiments, an index-matching glue is used to seal the ends 324 and 326 of the microfluidic channels.

Figure 3D:
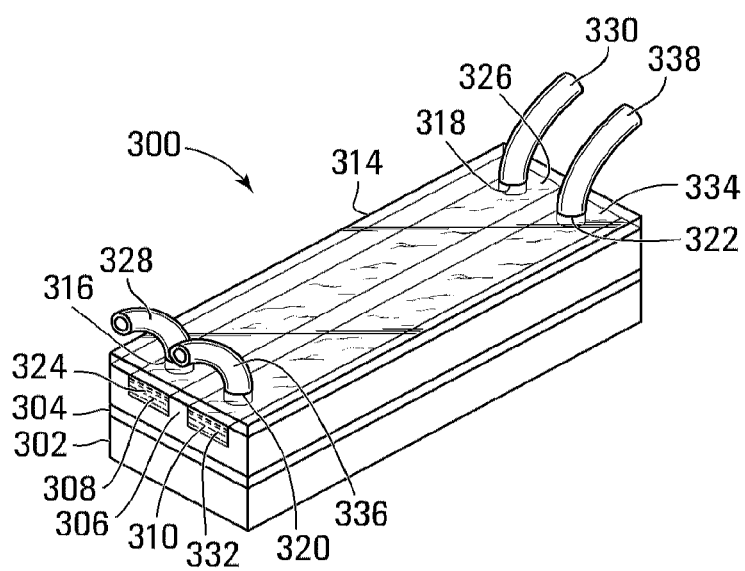
FIG. 3D is a perspective view of the SOI NEET based waveguide system shown in FIG. 3C having a second pair of fluidic tubes inserted through a second inlet port and a second outlet port of the seal-top in accordance with an embodiment of the present invention.

FIG. 3D is a perspective view of the SOI NEET based waveguide system shown in FIG. 3C having a second pair of fluidic tubes 336 and 338 inserted through the second inlet port 320 and the second outlet port 322 respectively of the seal-top 314 in accordance with an embodiment of the present invention. Ends 332 and 334 of the second microfluidic channel 310 are sealed in the same manner as the ends 324 and 326 of the first microfluidic channel 308.

Here, it can be seen that the bio-optical interaction can be controlled by introducing sample fluid in either side of the waveguide 306 through microfluidic channel 308 or 310, resulting in single bound evanescence, i.e. evanescence through only one wall of the waveguide, or the same NEET based waveguide system can also be used for dual bound evanescence by introducing fluids in both microfluidic channels 308 and 310 on either side of waveguide 306, which would cause a bio-optical interaction to occur on both sides of waveguide 306.

In some embodiments, nanofeatures are fabricated on both the top and the side walls of a waveguide and sample fluid is brought into contact with both the top and the side walls of the waveguide, resulting in a triple bound NEET based waveguide system.

Figure 4C:
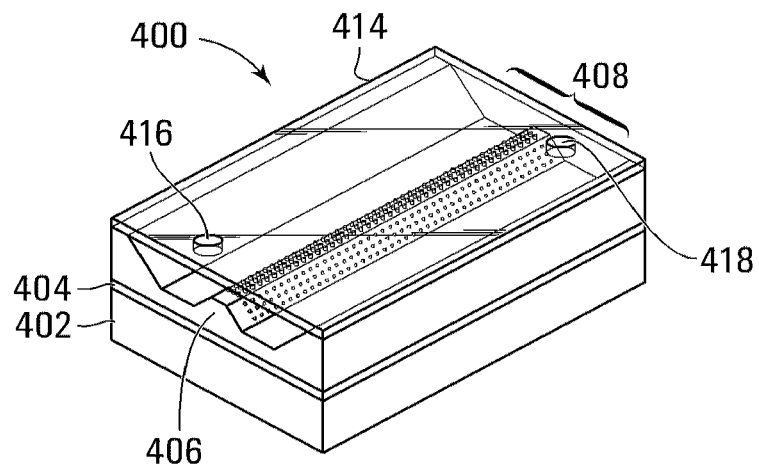
FIG. 4C is a perspective view of the SOI NEET based waveguide system shown in FIG. 4B having a seal-top incorporated thereon in accordance with an embodiment of the present invention.

An example of a triple bound NEET based waveguide system in accordance with an embodiment of the present invention is shown in FIGS. 4A to 4D. A single/dual bound evanescence system, such as the NEET based waveguide system illustrated in FIGS. 3A to 3D can be fabricated using single step lithography. The fabrication process of the triple bound NEET based waveguide shown in FIGS. 4A to 4D is a two stage process. In the first step, a device layer of the SOI is etched partially, enough to allow sufficient biological specimen in a gap between an upper surface of the waveguide and a seal-top for the microfluidic channel formed around the waveguide. An example of the result of this first step is shown in FIG. 4A. At this stage the SOI NEET based waveguide system 400 includes a silicon substrate 402, a buried oxide layer 404 and a partially etched device layer (made of silicon) 405.

In the second stage of microfabrication, a rib waveguide 406 and an integrated microfluidic channel 408 are etched and nanofeatures 415, 417 and 412 (shown in cutout in FIG. 4B) are fabricated on side walls 407, 409 and a top side wall 411 respectively of rib waveguide 406. In the example embodiment shown in FIG. 4B, the nanofeatures 415 and 417 located on the sidewalls 407 and 409 of the rib waveguide 406 are implemented as a plurality of nanocavities arranged in ordered rows along the length of the rib waveguide 406. Similarly, the nanofeatures on the top side wall 411 of the rib waveguide 406 are implemented as a plurality of nanopillars 412 arranged in ordered rows along the length of the rib waveguide 406. It should be noted that the locations, distribution, relative sizes and shapes of the nanopillars and nanocavities shown in FIG. 4B are merely an example of nanofeatures arranged in accordance with a very specific embodiment of the present invention, and should not be considered limiting as to the scope of the present invention.

Figure 4D:
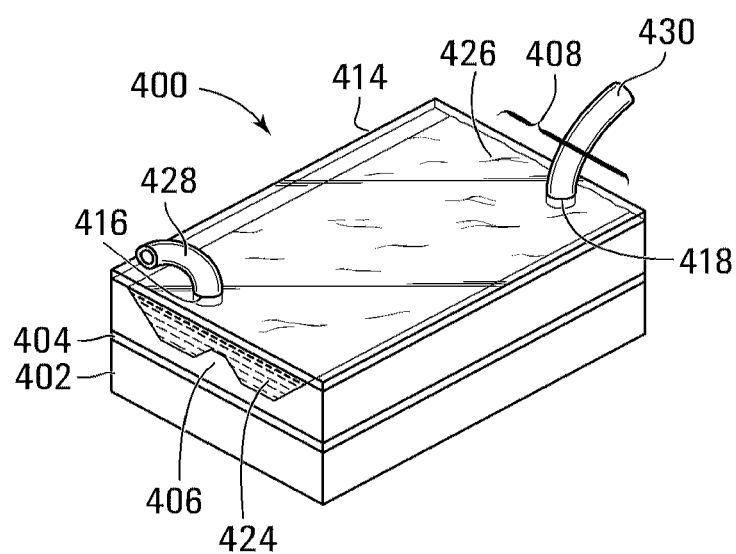
FIG. 4D is a perspective view of the SOI NEET based waveguide system shown in FIG. 4C having a pair of fluidic tubes inserted through an inlet port and an outlet port of the seal-top in accordance with an embodiment of the present invention.

The packaging of the device is subsequently carried out as shown in FIGS. 4C and 4D, which includes seal-top packaging with a seal-top 414 that includes an inlet port 416 and an outlet port 418, and the introduction of microfluidic tubes 428 and 430 through the inlet and outlet ports 416,418 and the sealing of ends 424 and 426 of the microfluidic channel 408. In some embodiments, the ends of the microfluidic channel 408 are sealed with index-matching glue.

In some embodiments, the microfluidic tubes 428 and 430 provide interconnections to a microfluidic actuation system for the introduction and evacuation of sample fluids into and out of the microfluidic channel 408.

In the example embodiments shown in FIGS. 3A to 3D and FIGS. 4A to 4D, one advantage of integrating a microfluidics module into the biosensor system is to use the microfluidic channels as the means to transport precisely controlled amount of chemical and biological specimen across the waveguide based devices, which can be useful for low sample volume detection. When a target specimen is present in this chemical or biological environment surrounding the waveguide, the concentration, the activity of the specimen, and its rate of reaction with its corresponding antibody causes a change in the bio-optical interaction resulting in the evanescence of the light being guided through the waveguide. This evanescence is enhanced by the integration of the nanofeatures with the waveguide surface as described herein.

By controlling the geometry of the waveguide itself, or the geometry and the layout of the nano-integrated features on the waveguide or both, the bio-optical interaction can be controlled: for example, by varying the profile of the waveguide side-walls, its length and the geometry along the length. This is illustrated by way of example in FIGS. 4B to 4D, in which the angle of inclination of the side walls 407 and 409 is less than 90 degrees, which gives the waveguide 406 a tapered vertical profile.

Some embodiments of the present invention utilize standard bulk microfabrication techniques, which provides for a potentially cost effective solution to in-situ medical diagnosis and chemical sensing requirements. The foregoing embodiments have been implemented in SOI technologies. However, all the above mentioned concepts can also be implemented with Silica-On-Silicon (SOS) and other material platforms as well. Utilizing standard silicon microfabrication techniques to manufacture a waveguide biosensor system in accordance with an embodiment of the present invention, the size of the sensing device can be reduced to the order of microns to a few nanometers and thus can be integrate easily with corresponding microfluidic modules.

An example of the operation of a NEET waveguide based sensing system in accordance with an embodiment of the present invention will now be described with reference to FIGS. 5A to 5D.

Figure 5A:
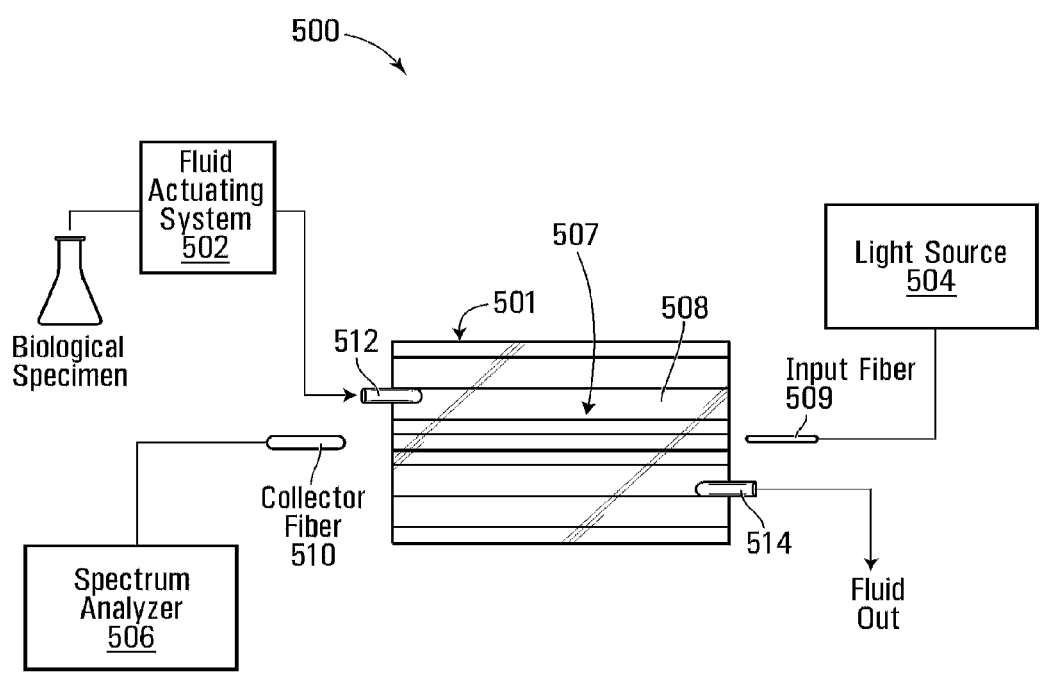
FIG. 5A is a schematic view of a NEET waveguide based sensing system in accordance with an embodiment of the present invention.

FIG. 5A is a schematic view of a NEET waveguide based sensing system 500 in accordance with an embodiment of the present invention. NEET waveguide based sensing system 500 includes a NEET waveguide based sensor 501, a fluid actuating system 502, a light source 504 and a spectrum analyzer 506. The NEET waveguide based sensor 501 is a triple bound NEET waveguide based sensor similar to triple bound NEET waveguide based sensor 400 shown in FIG. 4D. That is, NEET waveguide based sensor 501 includes a microfluidic channel 508 that surrounds three sides of a rib waveguide 507 and a microfluidic inlet tube 512 and a microfluidic outlet tube 514 provide fluidic communication with the microfluidic channel 508. The fluid actuating system is in fluidic communication with the microfluidic inlet tube 512. The light source 504 is interfaced with one end of the NEET waveguide based sensor 501 through an input fiber 509. The spectrum analyzer 506 is interfaced with an opposite end of the NEET waveguide based sensor 501 through a collector fiber 510. In some embodiments, the collector fiber 510 is larger in cross section than the end of the waveguide 507 with which it interfaces so as to improve optical collection.

Figure 5B:
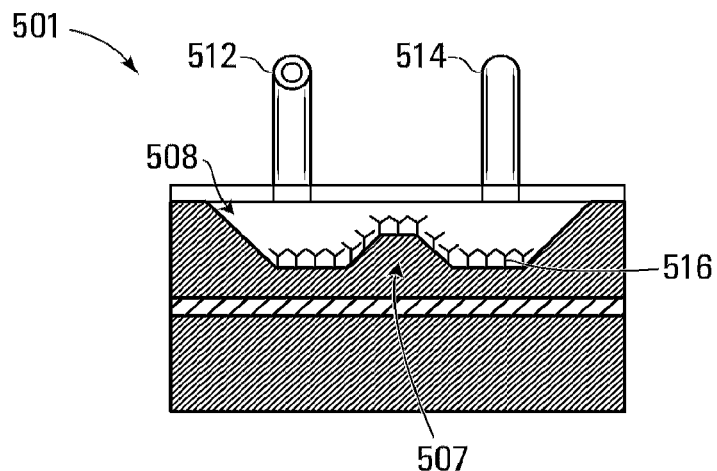
FIG. 5B is a cross-sectional view of a NEET waveguide based sensor during a first step of sensing operation in accordance with an embodiment of the present invention.

FIG. 5B is a cross-sectional view of the NEET waveguide based sensor 501 shown in FIG. 5A during a first step of sensing operation in accordance with an embodiment of the present invention. In this first step, antigen 516 are immobilized on the surfaces of the waveguide 507 using a passive immobilization technique.

Figure 5C:
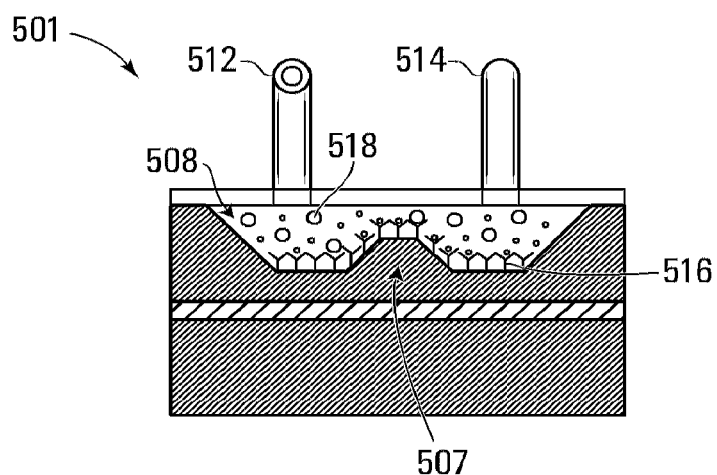
FIG. 5C is a cross-sectional view of the NEET waveguide based sensor shown in FIGS. 5A and 5B during a second step of sensing operation in accordance with an embodiment of the present invention.

FIG. 5C is a cross-sectional view of the NEET waveguide based sensor 501 shown in FIGS. 5A and 5B during a second step of sensing operation in accordance with an embodiment of the present invention. In this step, the microfluidic actuation system 502 (shown in FIG. 5A) introduces antibody 518 into the microfluidic channel 508 surrounding the waveguide 507 through the microfluidic inlet tube 512. The antibody 518 bonds with the antigen 516 immobilized on the surface of the waveguide 507.

Figure 5D:
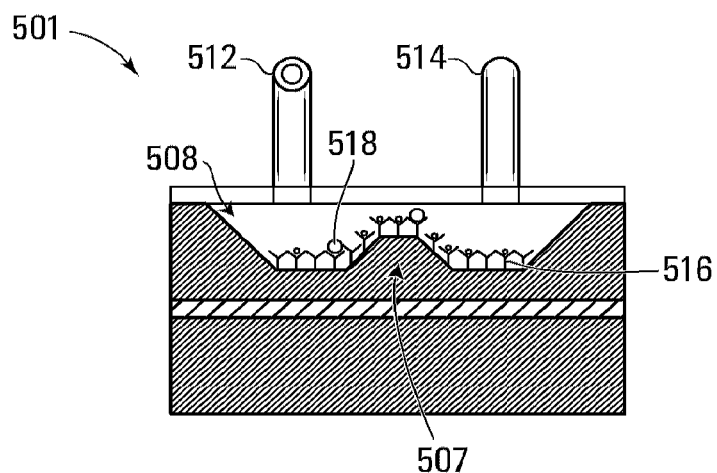
FIG. 5D is a cross-sectional view of the NEET waveguide based sensor shown in FIGS. 5A and 5B during a third step of sensing operation in accordance with an embodiment of the present invention.

FIG. 5D is a cross-sectional view of the NEET waveguide based sensor shown in FIGS. 5A and 5B during a third step of sensing operation in accordance with an embodiment of the present invention. In this step, excess antibody is flushed from the microfluidic channel 508 via the microfluidic outlet tube 514, and biosensing is performed by injecting light into the waveguide using the light source 504 (shown in FIG. 5A) and measuring the insertion loss of the light injected into waveguide 507 with the spectrum analyzer 506 (shown in FIG. 5A).

In some embodiments, visible and/or infrared light is injected into the NEET based waveguide 507 and as the light propagates through the NEET based waveguide 507 it is influenced by the presence of biological specimens in the cladding region of the waveguide 507.

The presence, concentration and the activity of the biological specimen is measured by studying the insertion loss of light through the rib waveguide due to the bio-optical interaction that takes place in the evanescent region of the waveguide.

Effectively, biosensing in the NEET based system 500 is carried out by the measurement of the insertion loss due to the evanescence of light that propagates through the waveguide 507.

The implementation of nanofeatures on the surface of the waveguide 507 directly affects the modal properties of the light passing through the waveguide 507 and thereby can lead to better bio-optical interaction through evanescence, which can potentially improve the sensitivity of the detection system. The integration of nanofeatures with the waveguide surface can help in increasing the effective evanescence and in addition to that, in some embodiments, the nanofeatures also improve the surface binding of biospecimens with the waveguide surface.

In the example embodiment shown in FIGS. 5A to 5D, it should be understood that NEET can be implemented in the system through the integration of nanofeatures, such as Nanotubes, Nanopillars, Nanocolloids, Nanospheres, Nanopores, Nanocavities, Nanorods, Nanofilms, etc or any of the combinations of the above.

It should be understood that in accordance with embodiments of the present invention, biological specimens, such as the antigen/antibody 516,518 shown in FIG. 5D interact with only the evanescent tail of the light. Therefore, the sensing process can be non-invasive and the bio-specimen can potentially be re-used for further detections.

In order to use silicon as a material for an optical waveguide, an appropriate wavelength of light is selected, preferably one for which silicon is substantially transparent. As silicon is transparent in the IR wavelength (1100-1600 nm), IR light is used in some embodiments of the present invention for biophotonic application as silicon absorbs optical wavelengths wavelength ranges lower than the IR range.

Silica, relative to silicon, is relatively transparent in the lower wavelength range, and therefore may be suitable for both visible and IR wavelengths (250-1100 nm). Other material platforms such as InP, GaAs and polymers can be used for their respective transparent wavelengths. Though there are other optical absorption methods, like the absorption, fluorescence, Surface Plasmon Resonance (SPR) etc., the proposed NEET system is simple for biosensing with the silicon waveguides in the IR spectral range of light and is nondestructive, i.e, for evanescence based detection, it is not necessary to alter the configurations of the biomolecule with additional tagged molecules.

In some embodiments, the nanofeatures are fabricated with the same material (e.g. Silica, Silicon, GaAs, InP, SU8, PDMS, other optical materials, optical polymers etc) as the material used to form the optical waveguide core. In some embodiments, the nanofeatures are fabricated from different nano-materials (for eg. Carbon Nanotubes, Gold Nanorods, Silver nanoparticles etc.) and are integrated subsequent to fabrication of the waveguide. While features like nanocavities and nanopillars can be fabricated on the same material platform as the waveguide as a part of the waveguide fabrication process, in some embodiments other features such as nanocolloids, nanospheres, nanorods, nanotubes etc. are fabricated from other material platforms.

Nanofeatures fabricated from different material than that used for the waveguide on which the nanofeatures are incorporated in accordance with the NEET technique provided herein typically have different refractive indices than the material of the waveguide. One of the potential advantages of NEET is that evanescence can be controlled by varying the properties of the nanofeatures, of which refractive index is an example, in accordance to the biological specimen to be tested.

The proposed NEET based biosensor can be fabricated with simple techniques such as anisotropic etching, isotropic etching, Deep Reactive Ion Etching (DRIE) etc. An important advantage of using the proposed system is that the bio-optical interaction can be controlled by controlling the waveguide geometry, the geometry and the assembly of the nano-evanescent promoters or both, as mentioned before. Thus, by inducing the appropriate degree of anisotropy, various waveguide geometries can be realized with the inclined tapered profiles of the sidewalls [1]. It is also possible to fabricate several other geometries of these micro-nano integrated waveguide based devices using hybrid micromachining technique [2], which involves careful isotropic fabrication followed by controlled anisotropic micromachining, suitable for fabrication of optical devices with very low surface roughness.

Two different bonding techniques that may be used in some embodiments of the present invention for the packaging of the seal-top cover to the rest of the waveguide structure, include Polymer Poly-dimethylsiloxane (PDMS) and index matching gels. The selection of either of these packaging options is an implementation specific detail that may depend, for example, upon the type of the top cover being used, e.g. Polycarbonate or Pyrex.

In addition to the top-cover packaging, techniques to incorporate microfluidic channels of external circuitry to the inlet/outlet ports with these top cover materials are also provided by some embodiments of the present invention.

Some embodiments of the present invention provide a method of integrating microfluidic actuation units within the system for the transportation of sample fluid into contact with the NEET waveguide based sensor and disposal of said fluid.

Some embodiments of the present invention provide a fully integrated, miniaturized, and portable Lab-On-a-Chip device that is capable of in-situ detection of target chemical and biological specimen through bio-optical interaction measurements through evanescence on SOI, Silica and other optical platforms suitable for visible/IR wavelengths.

Example embodiments demonstrating the increased evanescence that results from the addition of nanofeatures on an optical waveguide will now be described with reference to FIGS. 6 to 19.

Implementation of NEET with Nanopillars and Nanocavities

Figure 6:
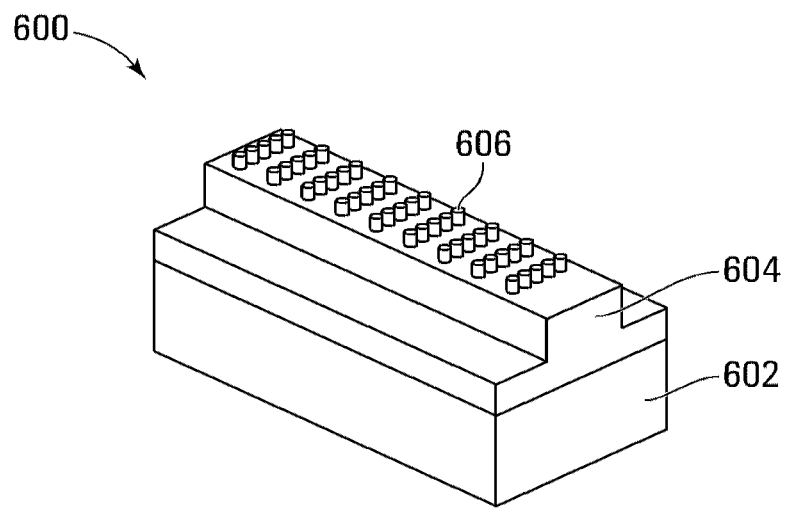
FIG. 6 is a perspective view of a SOI NEET waveguide having a plurality of nanopillars incorporated thereon in accordance with an embodiment of the present invention.

The integration of nanofeatures with an optical waveguide can improve the evanescence and thereby can enable more efficient biosensing. In order to study the effect of integrating nanofeatures on the evanescence behavior of light being guided through a waveguide, Finite Difference Time Domain (FDTD) [5] modeling was carried out for different propagation conditions of the waveguide with integrated nanofeatures. Herein, the waveguide system was modeled on a rectangular rib waveguide with integrated nanopillars as shown in FIG. 6. The optical rib waveguide 600 shown in FIG. 6 is implemented on a SOI platform and includes a waveguide slab 602, a rib waveguide core 604 and a plurality of nanopillars 606 implemented on a top side wall of the rib waveguide core 604. The plurality of nanopillars 606 are arranged in ordered arrays/rows along the length of the waveguide core 604. For modeling purposes the SOI square rib waveguide 600 was assumed to have a slab height of 0.1 $\mu$m, width 1 $\mu$m and total height 1 $\mu$m.

Figure 7:
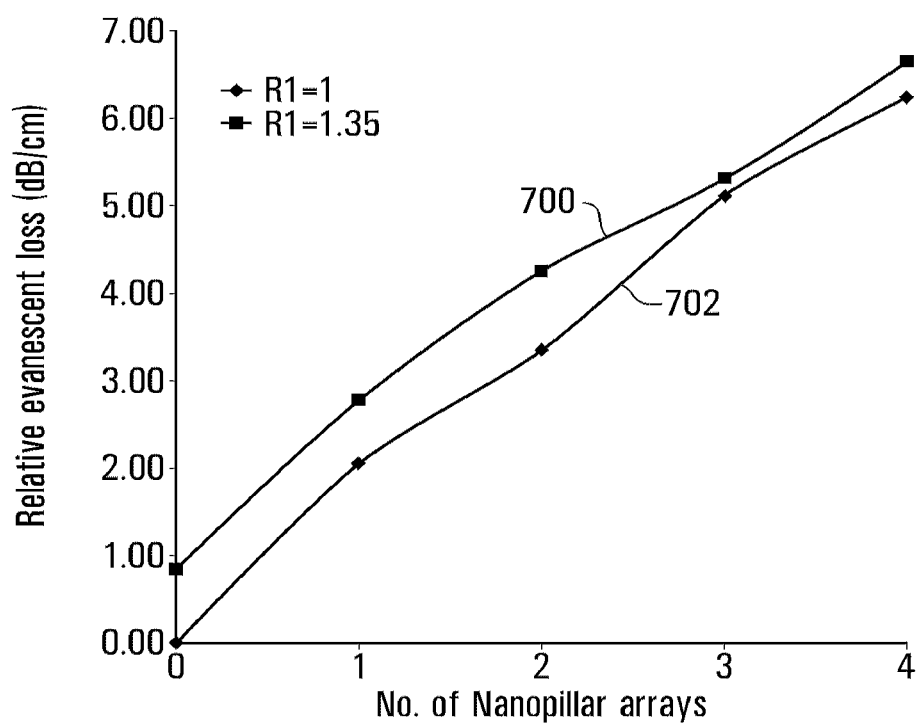
FIG. 7 is a plot of simulated relative evanescent loss vs. the number of nanopillar arrays for the waveguide shown in FIG. 6.

A single array consisting of 5 nanopillars, each separated by a distance, a, was modeled on the waveguide. The evanescent loss in the waveguide was studied for different number of nanopillar arrays. A time monitor was defined along the NEET region, i.e array of nanopillars (region of interest) and the total optical power in the monitor region due to evanescence during the propagation of 1550 nm TE wave was studied. The evanescence was studied for two different refractive indices (RI) of the surrounding medium, namely air (RI=1) and Hydrogen Peroxide (RI~1.35). The results 700 and 702 for RI=1 and RI=1.35 are shown in FIG. 7. Herein, the relative evanescence is measured with respect to propagation condition without nanopillars on the waveguide.

It can be seen that with an increase in the number of nanopillar arrays, there is a clear increase in evanescence, thereby proving that the integration of nanopillars affects the performance of the proposed device and the evanescence can be tuned by the addition of nanopillars with the waveguides.

Two different types of nanofeatures were studied for integration with the waveguide, namely silicon nanopillars and nanocavities on the top layer of waveguide. Similar to the previous study, arrays of nanocavities were modeled on the silicon waveguide, as schematically shown in FIG. 8 and the effect of nanocavities on the evanescence behavior of light was studied for two different refractive indices.

Figure 8:
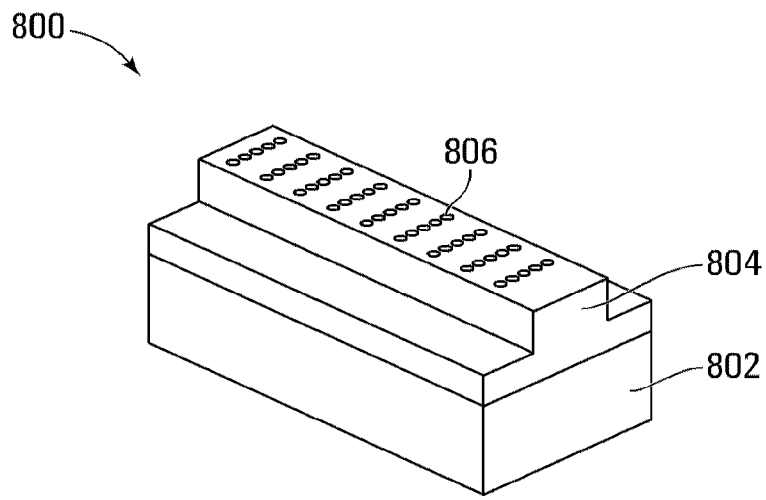
FIG. 8 is a perspective view of a SOI NEET waveguide having a plurality of nanocavities incorporated thereon in accordance with an embodiment of the present invention.

FIG. 8 is a perspective view of a SOI NEET waveguide 800 having a plurality of nanocavities 806 incorporated thereon in accordance with an embodiment of the present invention. The waveguide 800 is implemented on a waveguide slab 802 and includes a rib waveguide core 804. The plurality of nanocavities are implemented in ordered arrays/rows along the length of the rib waveguide core 804.

Figure 9:
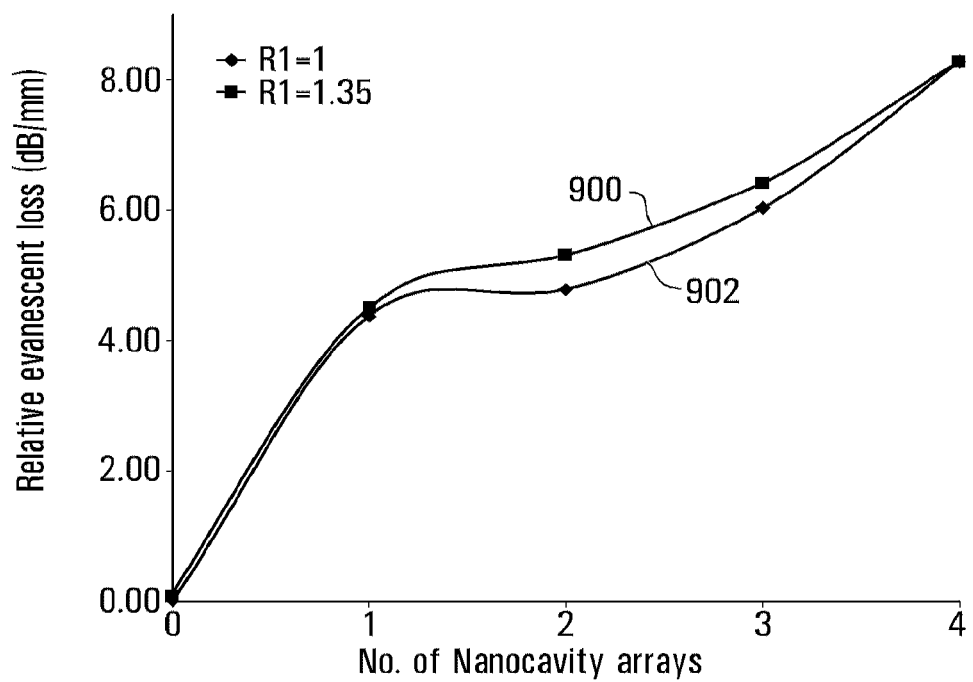
FIG. 9 is a plot of simulated relative evanescent loss vs. the number of nanocavity arrays for the waveguide shown in FIG. 8.

The evanescent loss due to nanocavities is shown in FIG. 9. Curve 900 represents the relative evanescent loss for a surrounding RI=1.35, while curve 902 represents the relative evanescent loss for a surrounding RI=1. It can be seen that increasing the number of nanopillars and nanocavities increases the evanescence of light from the waveguide. From the results of the FDTD analysis, it can be concluded that both nanopillars and nanocavities improve the evanescence behavior of light from the waveguide.

Therefore, the evanescence can be appropriately tuned by defining the number of nanofeatures, nanocavities and nanopillars or a combination of both, on the waveguide. Both the above studies were carried out for nano-integration only on the top wall of the waveguide. In a similar fashion, evanescence can also be increased by defining nanofeatures along the sidewalls of the waveguide and also along the slab of the waveguide.

Figure 10:
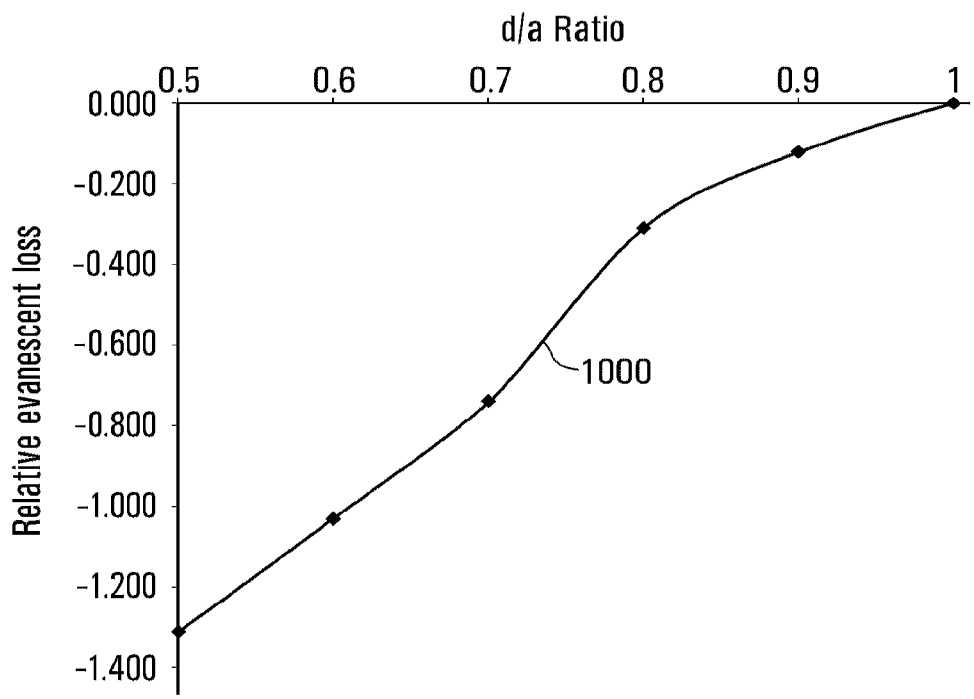
FIG. 10 is a plot of variation of relative evanescent loss with respect to d/a ratio of nanopillars integrated on a SOI waveguide.

In the next study, the distance between the nanofeatures was varied and the effect on evanescence was studied. Herein, the evanescence was studied with nanopillars by varying the d/a ratio, where a is the distance between each nanopillar and d is the diameter of the nanopillar. For modeling, a diameter of 100 nm was chosen and the distance between each array of nanopillars on the waveguide was 500 nm. The results 1000 are as shown in FIG. 10.

Herein the relative evanescent loss is the evanescence measured with respect to d/a=1. When the distance between the nanopillars, a, is increased evanescence decreases.

Figure 11:
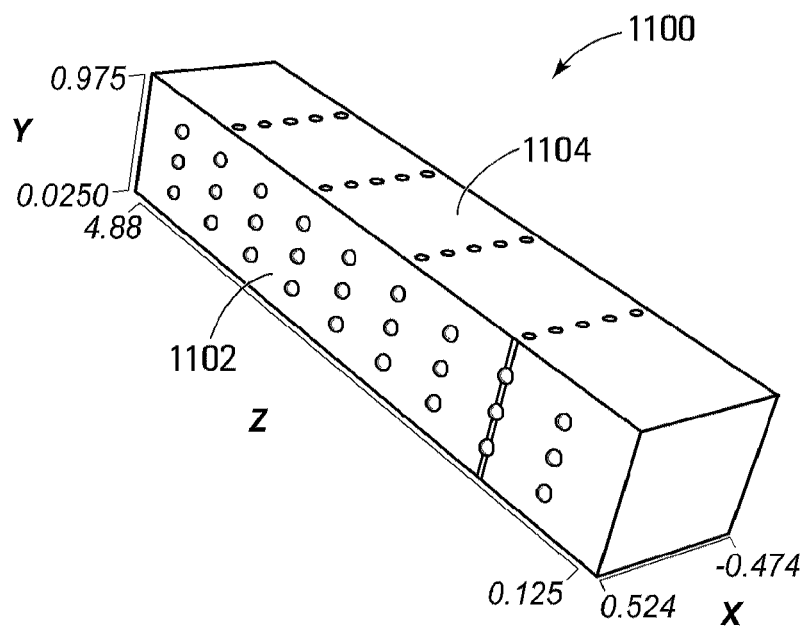
FIG. 11 is a schematic depiction of a silicon waveguide strip integrated with nanospheres.

In order to study the evanescence from the sidewalls of the waveguides, the system was modeled with silicon nanospheres integrated on the sides of the waveguide. The schematic waveguide design is as shown in FIG. 11. In the embodiment shown in FIG. 11, the SOI waveguide strip 1100 includes a plurality of nanocavities 1104 on a top side wall of the waveguide and a plurality of nanospheres 1102 on a vertical side wall of the waveguide. Herein a time monitor was defined in the region of the nanospheres (region of interest) and the effect of nanospheres on the evanescent behavior of the waveguide was studied.

Figure 12:
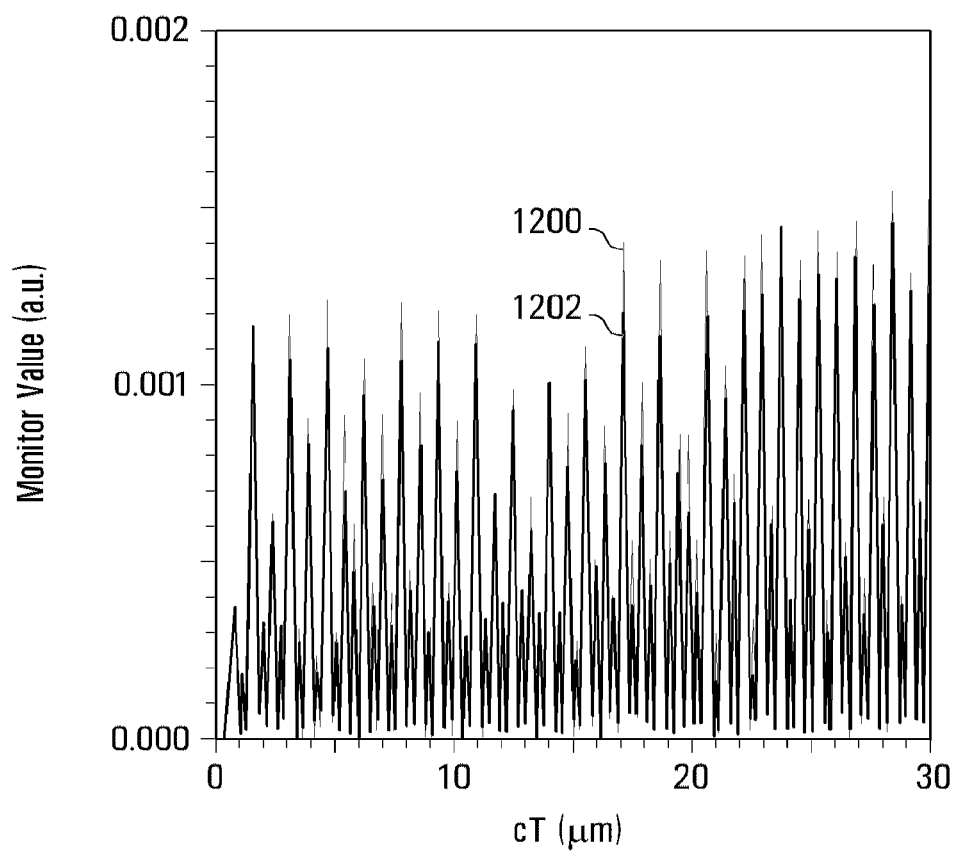
FIG. 12 is a plot of results of FDTD analysis of evanescence loss from the side walls silicon waveguide with and without integrated nanospheres.
Figure 13:
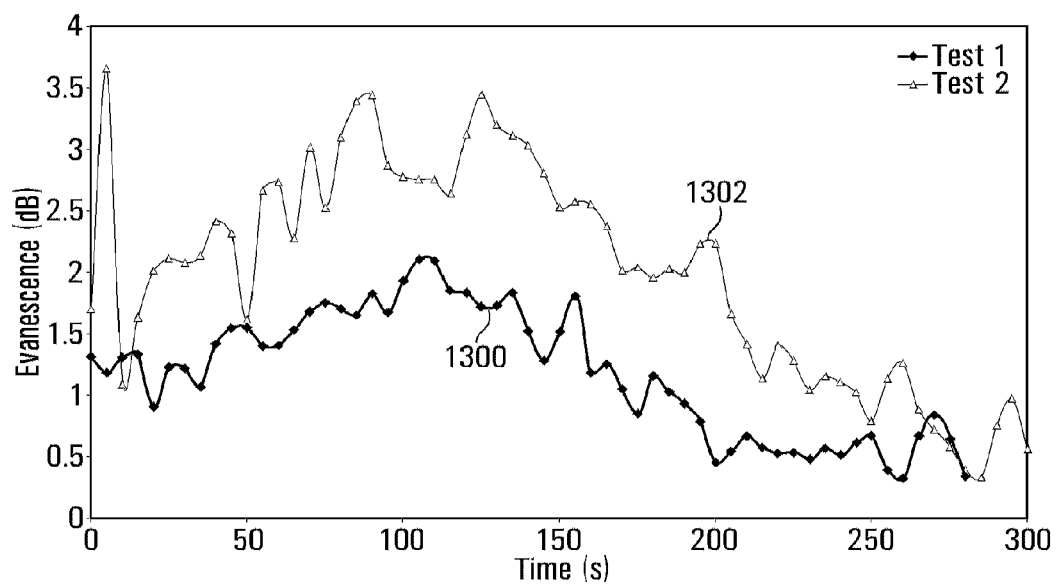
FIG. 13 is a plot of measurement results of evanescence loss with time for HRP—$H_2O_2$ with rectangular waveguides.

The results 1200 and 1202 are as shown in FIG. 12. Herein the total evanescence in the monitor region between waveguides with nanospheres and without nanospheres was compared. It can be seen that greater evanescence loss is observed from waveguides whose sidewalls are integrated with nanospheres, than plain sidewalls.

Evanescence Measurements

An example of the feasibility of evanescence measurements on the biosensor system is herein demonstrated with the detection of enzyme HRP, upon its reaction with $H_2O_2$. HRP used in the experiments is a commercial grade 9003-99-0 bought from Sigma, St. Louis, USA and the hydrogen peroxide is the standard grade bought from Sigma, USA. The concentration of the enzyme used was 1% to the active ingredient in aqueous solution while the substrate $H_2O_2$ used was 30% by weight solution. But in order to understand the optical behavior of the biological specimens in different wavelength ranges, optical absorption measurements were carried out, the absorption coefficients were computed for the maximum optical loss for HRP—$H_2O_2$ reaction and the results are as tabulated in Table 1. It can be seen that the absorption coefficient is maximum in the infrared region for the given enzyme/anti-enzyme pair.

TABLE 1

Absorption coefficients for the HRP- $H_2O_2$ reaction

| Wavelength of light (nm) | Maximum absorbance for HRP- $H_2O_2$ | Previous results obtained | Loss in dB | Absorption coefficient (cm$^{-1}$) |
|---|---|---|---|---|
| 470 | 0.06 | ~0.03 [3] | 0.6 | 138.155 |
| 635 | 0.09 | ~0.02 [4] | 0.9 | 207.37 |
| 1550 | 0.3 | N/A* | 3 | 690.77 |

*N/A: Not available

The study of absorption characterization shows that even though absorption is useful to study the reaction of an enzyme with its anti-enzyme, it is heavily dependant upon the volume of the reactants used. Hence, it is important to study the bio-optical interaction using the principle of evanescence for accurate and controlled biosensing.

In the biophotonic test setup for evanescence measurements, the input light at 1550 nm was guided through a fiber from a laser source (Photonetics, Tunics BT). FC connectorized tapered lens ended fiber (OZ optics, ON, Canada), which gives a spot size of 5 μm at a distance of 26 μm, was used for the optical input. Both the input fiber and the waveguide device were mounted on individual xyz-micropositioners. The light from the waveguide was collected using the GRIN lens mounted on an adjustable positioner, and coupled to the spectrum analyzer.

Evanescence Measurements on Rectangular Rib Waveguides

The rib waveguide used in the present experiments was fabricated through the MicraGeM process technology [6]. The alignment of the waveguide with respect to the fiber was carried out by the observation under the microscope. The minimum volume of liquid added using the pipette was less than 0.2 μl.

Figure 14A:
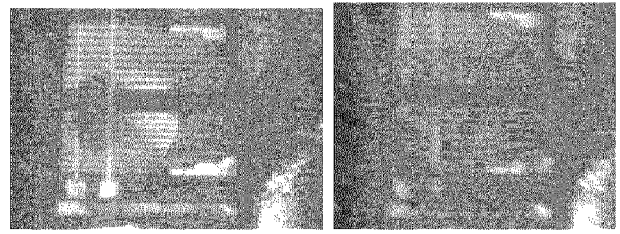
FIGS. 14A and 14B are photographs during the reactions that resulted in the measurement results shown in FIG. 13.
Figure 14B:
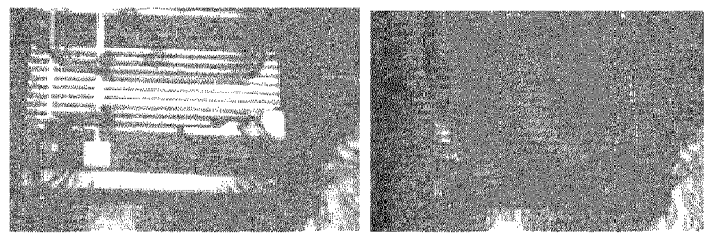
Figure 15:
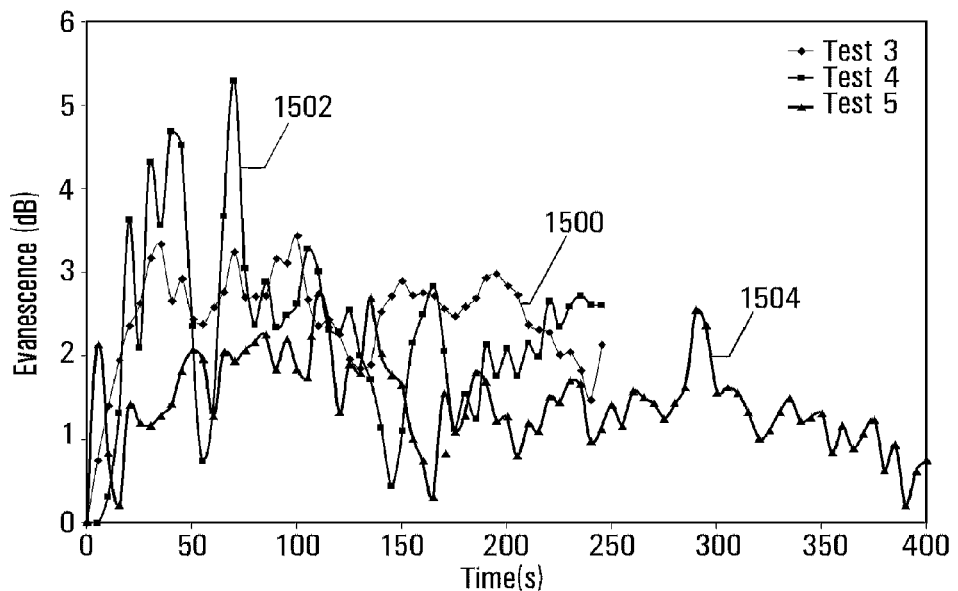
FIG. 15 is a plot of measurement results of evanescence loss with time for HRP—$H_2O_2$ with anisotropic SOI waveguides.
Figure 16A:
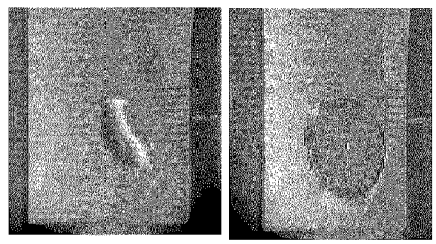
FIGS. 16A, 16B and 16C are photographs during the reactions that resulted in the measurement results shown in FIG. 15.
Figure 16B:
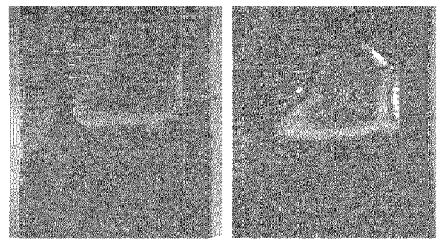
Figure 16C:
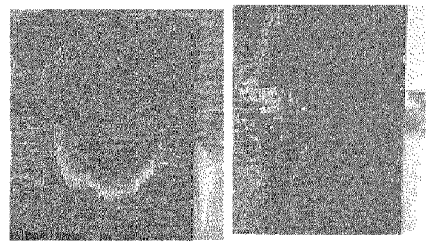

Experiments were repeated for sufficient number of times till the results showed the loss due to evanescence alone on the rectangular rib waveguides. $H_2O_2$ was passively immobilized on the surface of the waveguide and HRP was subsequently added to start the instantaneous reaction. Two successful experiments were carried out and the results 1300 and 1302 are as shown in FIG. 13A along with the corresponding images of the reaction, as shown in FIGS. 14A and 14B.

The trend for evanescence is similar for Tests 1 and 2. However, the evanescent field length is different for both these cases as seen from the corresponding reaction pictures, which is believed to have caused the difference in evanescence loss measured. In case of Test 1, $H_2O_2$ was added initially and then HRP was added to the antibody. However, in Test 2, $H_2O_2$ was added subsequently after HRP was added initially, so as to check the evanescence due to HRP alone initially and then due to the reaction.

Evanescence Measurements with Anisotropic SOI Rib Waveguides

SOI waveguides anisotropically etched with Tetra Methyl Ammonium Hydroxide (TMAH) were used to demonstrate the evanescence due to variations in the sidewall taper angle. Herein, waveguides with walls inclined at 35.26° were used for the biosensing experiments and evanescence studies. The testing setup was the same one as used in the previous experiments. Peroxide anti-enzyme was immobilized on to the surface of the waveguide and the enzyme was added to it. The volume of both anti-enzyme and enzyme was ~1 μl. The results 1500, 1502 and 1504 of the evanescence study have been plotted in FIG. 15. Photographic images of the reaction between the enzyme and the antibody which occurred during evanescence that led to the results 1500, 1502 and 1504.

Figure 17A:
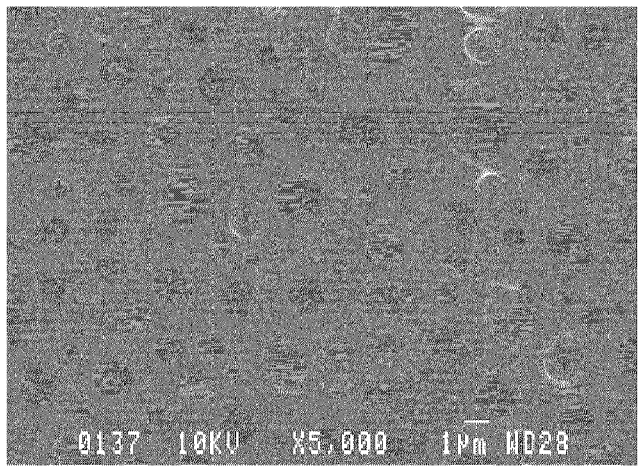
FIGS. 17A, 17B and 17C are photographs taken with a scanning electron microscope of a waveguide surface with different biological specimens present thereon.
Figure 17B:
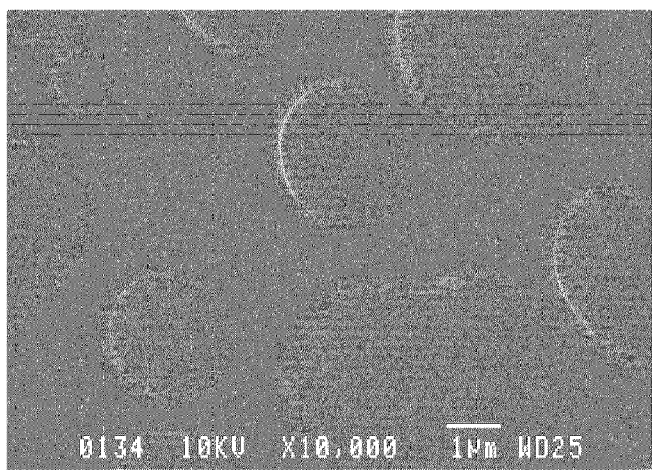
Figure 17C:
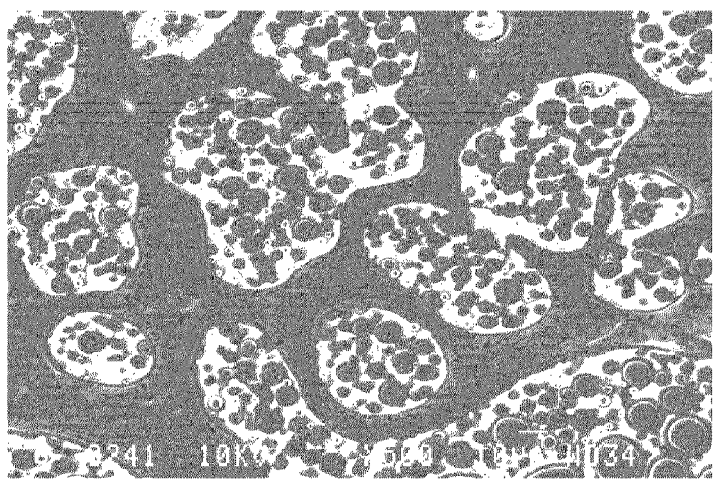

FIGS. 17A to 17C show the SEM images of the waveguide surface with the different specimen. It is thus known that when the enzyme is added and the antibody is introduced, there is a biological layer which is formed on the surface of the waveguide, as seen in FIGS. 17A to 17C, which causes evanescence. In FIGS. 17A to 17C, the specimens on the surface of the waveguide are $H_2O_2$, HRP and HRP—$H_2O_2$, respectively.

Calculation of Evanescence Coefficient

From the evanescence loss for the waveguides, the evanescence coefficient of the HRP—$H_2O_2$ reaction was calculated in order to standardize the evanescence measurements. From the results of the experiments, the evanescent loss coefficient was computed for each of the specimen. Individual lengths of the evanescent field enzymes were measured from the corresponding images taken under the microscope. Let the length of the waveguide covered by the specimen, in microns, be denoted by $L_i$ (i corresponds to the biological specimen that causes evanescence, i.e HRP or $H_2O_2$ or the reaction mixture of HRP—$H_2O_2$, denoted as HH) and the optical loss due to the individual specimen i be $\Delta P_i$. Herein, it is assumed that evanescent field length over which the reaction occurs is the length of the waveguide over which the antibody was immobilized initially. Accordingly, the total evanescence loss in dB/cm was computed by the following relation $$\beta_{ev}(dB/cm) = \sum_{i=HH,HRP,H_2O_2} \{(\Delta P_i / L_i)\} \times 10^4. \quad (1)$$

From the above relation, the evanescence coefficient is calculated as $$\alpha_{ev} = \beta_{ev}/[10 * \log_{10}(e)]. \quad (2)$$

The evanescent loss is taken as the maximum power loss observed during the reaction. The values of the evanescence coefficient obtained from the different experiments are tabulated in Table 2.

TABLE 2

Evanescent coefficient for the different experiments carried out with the rectangular rib waveguides and the anisotropic waveguides for the HRP-$H_2O_2$ reaction.

| Experiment | Maximum evanescent loss (dB) | Average evanescent loss (dB) | Evanescent field length (µm) | Evanescent loss (dB/cm) | Evanescent coefficient (cm$^{-1}$) |
|---|---|---|---|---|---|
| Test 1 | 2.108 | 1.519 | 720 | 12.655 | 2.91 |
| Test 2 | 5.148 | 4.231 | 1320 | 32.05 | 7.37 |
| Test 3 | 3.43 | 2.89 | 988 | 8.79 | 2.02 |
| Test 4 | 5.289 | 2.48 | 3300 | 7.515 | 1.73 |
| Test 5 | 2.65 | 1.65 | 2541 | 6.493 | 1.49 |

Figure 18A:
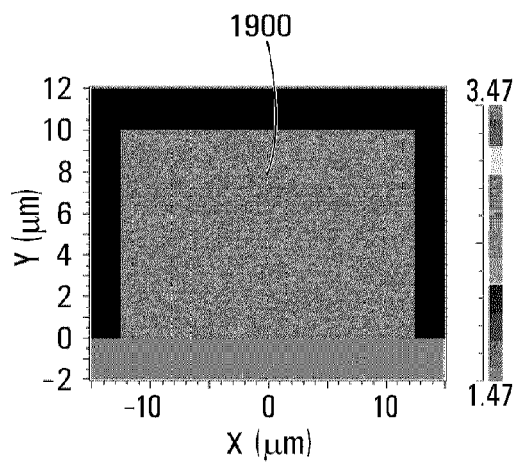
FIG. 18A is a depiction of a cross-section of a rib waveguide.
Figure 18B:
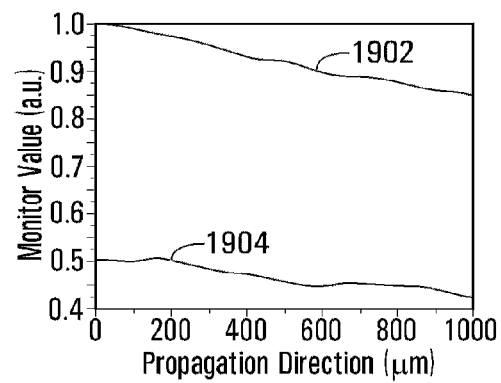
FIG. 18B is a plot of simulated total power and waveguide power obtained for the rib waveguide shown in FIG. 18A.
Figure 18C:
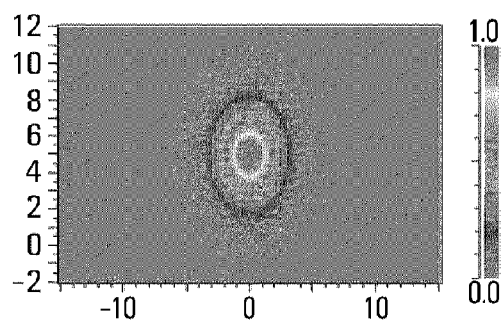
FIG. 18C is a plot of field amplitude at the input of the rib waveguide shown in FIG. 18A.
Figure 18D:
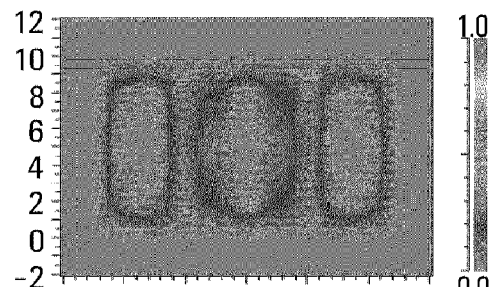
FIG. 18D is a plot of field amplitude at the output of the rib waveguide shown in FIG. 18A.

In order to verify the experimental results, Finite Difference BPM simulations were carried out using R-Soft [7] and the evanescence was computed. A model of the rectangular waveguide 1900 with the parameters as shown in FIG. 18A was designed and the propagation analysis was carried out using BPM. The evanescent loss was computed using two inbuilt function of the R-Soft, namely the Total power (TP) function and the Waveguide power (WP) function. The total power function computes the total power in the computed optical field at the relevant z-position and the waveguide power function computes the integral power in the calculated field at the relevant z-position over the waveguide cross-section. Therefore, the evanescent loss was calculated as Evanescent power loss EP(dB)=$WP_{sp}$(dB)−$WP_{air}$ (dB), (3)

where, $WP_{sp}$ is the waveguide power due to the specimen cladding and $WP_{air}$ is the waveguide power with air cladding. The simulations were carried out by varying the refractive index of the covering medium of the waveguide and the evanescent power loss was determined for each condition. The length of the waveguide was taken as 1000 µm. The value of the waveguide power at z=0 gives the optical coupling loss between the fiber and the waveguide. From the results obtained, the loss in dB/cm was obtained and the coefficient of evanescence was calculated for the different conditions, as presented in Table 3.

TABLE 3

Evanescent loss measured with BPM on rectangular rib waveguides.

| Refractive index of covering medium | Evanescence per 1000 µm (dB) | Evanescent loss (dB/cm) | Relative evanescent loss (dB/cm) |
|---|---|---|---|
| 1 | 3.01 | 30.1 | 0 |
| 2 + 2i | 3.32 | 33.2 | 3.1 |
| 3 + 2i | 3.56 | 35.6 | 5.5 |
| 4 + 2i | 3.73 | 37.3 | 7.2 |

Figure 19A:
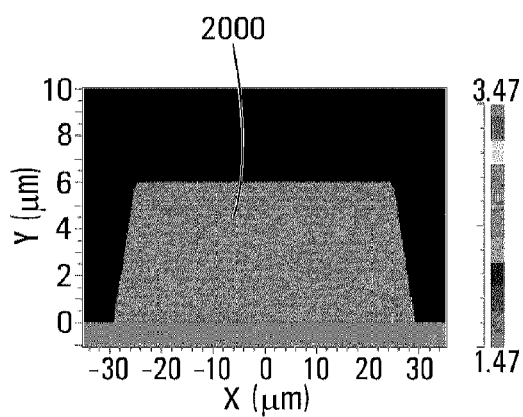
FIG. 19A is a depiction of a cross-section of a rib waveguide having tapered side walls.
Figure 19B:
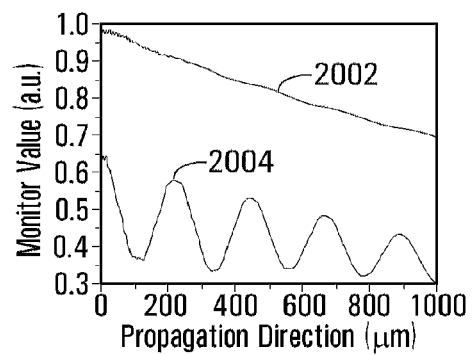
FIG. 19B is a plot of simulated total power and waveguide power obtained for the rib waveguide shown in FIG. 19A.
Figure 19C:
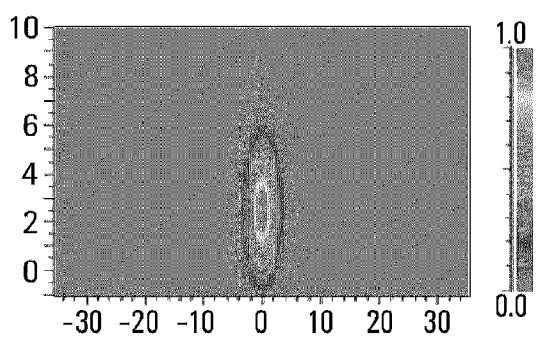
FIG. 19C is a plot of field amplitude at the input of the rib waveguide shown in FIG. 19A.
Figure 19D:
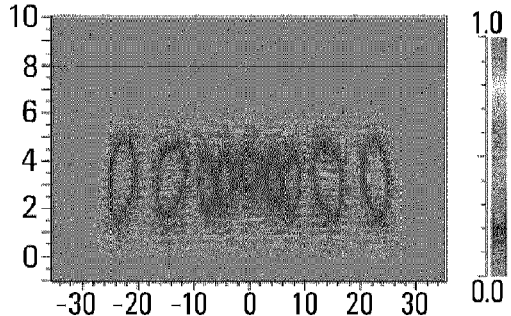
FIG. 19D is a plot of field amplitude at the output of the rib waveguide shown in FIG. 19A.

A model of anisotropic SOI waveguide 200 was drafted as shown in FIG. 19A and the BPM was carried out for various refractive indices of the medium. Simulated results 2002 and 2004 for the total power and waveguide power are illustrated in FIG. 19B. The evanescent loss was computed as tabulated in Table 4

TABLE 4

Evanescent loss measured with BPM on anisotropic SOI waveguides.

| Refractive index of covering medium | Evanescence per 1000 µm (dB) | Evanescent loss (dB/cm) | Relative evanescent loss (dB/cm) |
|---|---|---|---|
| 1 | 3.29 | 32.9 | 0 |
| 2 + 2i | 3.64 | 36.4 | 3.5 |
| 3 + 2i | 4.02 | 40.2 | 7.3 |
| 4 + 2i | 4.32 | 43.2 | 10.3 |

The relative evanescent loss shown in Table 3 and 4 show the increase in evanescent loss with increase in refractive index of the cladding. This phenomenon demonstrates that evanescent loss occurs due to the change in the optical properties of the cladding. There are certain issues which have to be noted in drawing a comparison between the predicted results with BPM and the experimental values of evanescence obtained. One must note that, it is practically impossible to create a simulation system with the real-time conditions because of several physical and biological factors. Secondly, all the theoretical evanescence calculations have been approximated in measurements of the evanescent field lengths. In case of computation of the evanescence coefficient using the rectangular rib waveguides, the evanescent field was assumed to be along the top of the waveguide and the sides. The experiment suffers from certain limitations like the scattering of light due to sidewall roughness, minor misalignment losses and calculation of the exact refractive index of the cladding material. Therefore, the results presented so far have demonstrated the phenomenon of evanescence with change in the refractive index of the cladding material, which would represent the presence of biological reactions in the cladding.

Some embodiments of the present invention provide portable, miniaturized, micro-nano integrated biosensor system on silicon platform is provided for rapid in-situ detection of chemical and biological specimen on Lab-on-a-Chip or Micro-Total Analysis Systems.

Some embodiments of the present invention integrate nanoparticles, such as nanopillars, nanocavities, nanorods, nanotubes etc., and microphotonic elements on any suitable material platform, to provide a cost effective solution to the needs of in-situ chemical and biomedical detection and Point-Of-Care Testing (POCT) devices. Some embodiments of the present invention detect biological and chemical interaction on a Silicon/SOI platform in the IR as well as visible spectra of light. In some embodiments, different standard micromachining techniques are used in order to microfabricate NEET incorporated biosensor system on several material platforms. The proposed Nano-Enhanced Evanescence integrated Technique (NEET) can potentially improve the efficiency of the sensor system. Potential applications for embodiments of the present invention include nano-integrated evanescence based bio and/or chemical sensors on silicon and/or SOI platforms integrated with microfluidic, micromechanical, micro-optical and microelectronic elements that can be microfabricated and micromachined on the silicon and SOI platforms.

While the illustrated embodiments depicted in the drawings include nanofeatures arranged in an ordered manner along a length of a rib waveguide, more generally any waveguide core geometry and any arrangement and geometry of nanofeatures incorporated onto said waveguide in accordance with the NEET principles described herein, including, for example, randomized distributions of nanofeatures of varied dimensions, are contemplated within the scope of the present invention.

Any variation in the geometry of the waveguide (e.g inclination of the sidewalls,) or the dimensions of the nanofeatures (e.g layout and size of the nanofeatures) directly influences the modal perturbations of the light passing through the waveguide, which in turn affect the evanescence.

The choice of the dimension and arrangement of the nanofeatures, which can be controlled by the fabrication and integration technique used to produce waveguide based devices in accordance with embodiments of the present invention, may depend upon many factors, such as, for example, wavelength of light to be used in operation of the devices, dimensions of the waveguide(s), desired sensitivity of a sensing system incorporating the device(s), physical properties of the biological specimen to be tested for, etc.

In some embodiments, a plurality of NEET based waveguides are incorporated into a NEET based sensing system. In some embodiments, the plurality of waveguides are used for NEET based detections of different sample specimens. In some embodiments, through proper design of the waveguide system, two waveguides with a common microfluidic channel therebetween are used for absorption and fluorescence detections. Similarly, in some embodiments, a combination of many waveguides could also be used to enhance the evanescence, for a single sample specimen.

Figure 20:
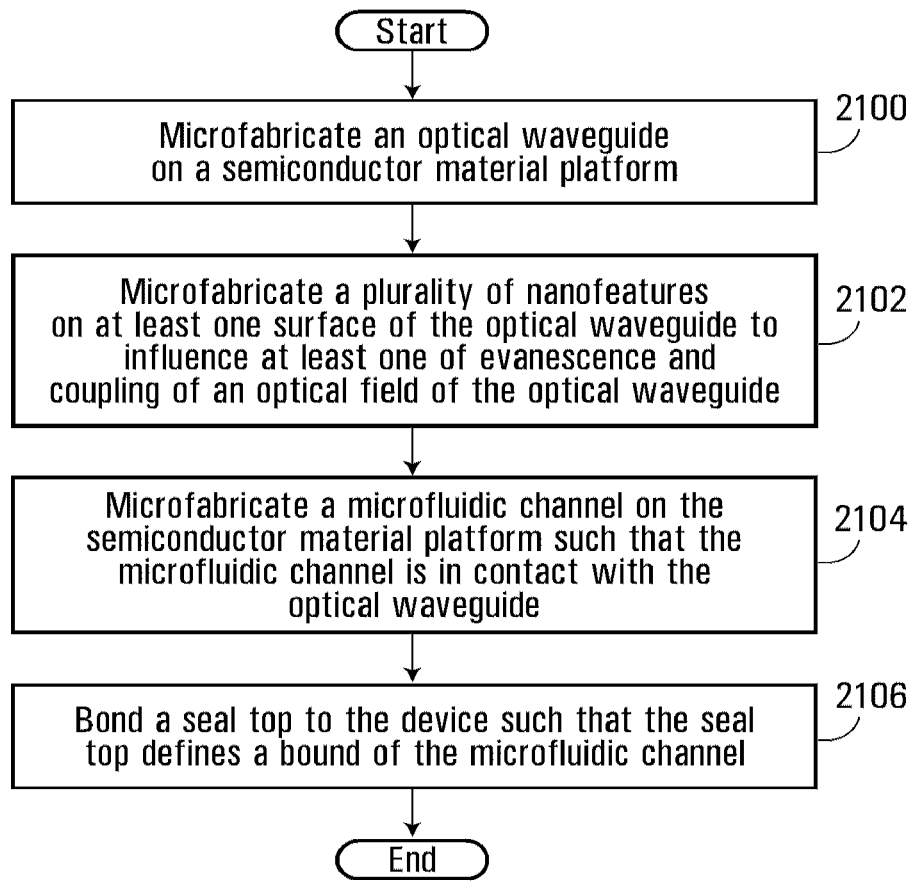
FIG. 20 is a flowchart of a method of fabricating a device in accordance with an embodiment of the present invention.

A method of fabricating a device in accordance with an embodiment of the present invention will now be described with reference to the flowchart illustrated in FIG. 20.

The method of fabricating a device begins at block 2100 in which an optical waveguide is microfabricated on a semiconductor material platform.

Following block 2100, the method proceeds to block 2102, in which a plurality of nanofeatures is microfabricated on at least one surface of the optical waveguide to influence at least one of evanescence and coupling of an optical field of the optical waveguide.

In some embodiments, the method further comprises microfabricating a microfluidic channel on the semiconductor material platform such that the microfluidic channel is in contact with the optical waveguide. This is illustrated in block 2104 of FIG. 20.

In some embodiments, the method further comprises bonding a seal top to the device such that the seal top defines a bound of the microfluidic channel. This is illustrated in block 2106 of FIG. 20.

In some embodiments, microfabricating the plurality of nanofeatures in block 2102 comprises microfabricating at least some of the plurality of nanofeatures with a material having a different refractive index than that of the optical waveguide.

In some embodiments, microfabricating the plurality of nanofeatures in block 2102 comprises microfabricating the plurality of nanofeatures such that they increase surface binding of bio-specimens on the optical waveguide.

In some embodiments, microfabricating the optical waveguide in block 2100 comprises microfabricating the optical waveguide from a material that is substantially transparent to light in the visible spectrum and/or infrared spectrum.

In some embodiments, microfabricating the plurality of nanofeatures in block 2102 comprises microfabricating at least one of: nanoparticles, nanopillars, nanocavities, nanotubes, nanorods, nanofilms, nanocolloids and nanospheres, on at least one surface of the optical waveguide.

In some embodiments, microfabricating the plurality of nanofeatures in block 2102 comprises microfabricating at least one row of nanofeatures arranged substantially transverse to a direction of propagation of light through the optical waveguide.

In some embodiments, microfabricating at least one row of nanofeatures arranged substantially transverse to a direction of propagation of light through the optical waveguide comprises microfabricating the nanofeatures in the at least one row such that they are spaced apart by an equal distance.

In some embodiments, microfabricating at least one row of nanofeatures arranged substantially transverse to a direction of propagation of light through the optical waveguide comprises microfabricating the nanofeatures in the at least one row such that they are randomly distributed.

In some embodiments, microfabricating at least one row of nanofeatures arranged substantially transverse to a direction of propagation of light through the optical waveguide comprises microfabricating a plurality of rows of nanofeatures, the plurality of rows being equally spaced apart along a length of the optical waveguide.

In some embodiments, microfabricating at least one row of nanofeatures arranged substantially transverse to a direction of propagation of light through the optical waveguide comprises microfabricating a plurality of rows of nanofeatures, the plurality of rows being randomly distributed apart along a length of the optical waveguide.

In some embodiments, microfabricating the plurality of nanofeatures in block 2102 comprises microfabricating a plurality of nanofeatures of varied sizes and/or shapes.

In some embodiments, microfabricating the optical waveguide in block 2100 comprises microfabricating an optical rib waveguide having a first side wall, a second side wall opposite the first side wall and a top side wall joining the first side wall and the second side wall.

In some embodiments, microfabricating an optical rib waveguide comprises microfabricating the optical rib waveguide such that an angle of inclination of the first side wall and the second side wall of the optical rib waveguide is less than 90 degrees.

In some embodiments, microfabricating a plurality of nanofeatures on at least one surface of the optical waveguide in block 2102 comprises microfabricating the plurality of nanofeatures on at least one of the first side wall, the second side wall and the top side wall of the optical rib waveguide.

In some embodiments, microfabricating the plurality of nanofeatures in block 2102 comprises microfabricating the plurality of nanofeatures using at least one micro fabrication technique selected from the group consisting of: Plasma Enhanced Chemical Vapor Deposition (PECVD), Chemical Vapor Deposition (CVD), Deposition techniques, Etching, Chemical Synthesis Colloidal growth, and adsorption.

In some embodiments, microfabricating the microfluidic channel in block 2104 comprises microfabricating the microfluidic channel such that it is in contact with two or more sides of the optical waveguide.

In some embodiments, microfabricating the microfluidic channel in block 2104 and the plurality of nanofeatures in block 2102 comprises microfabricating the microfluidic channel and the plurality of nanofeatures such that each side of the optical waveguide that is in contact with the microfluidic channel has nanofeatures of the plurality of nanofeatures integrated thereon.

In some embodiments, bonding a seal top to the device in block 2106 comprises bonding a seal top to the device that has an inlet port for delivery of a sample specimen fluid into the microfluidic channel; and an outlet port for removal of the sample specimen fluid from the microfluidic channel.

In some embodiments, microfabricating the microfluidic channel in block 2104 comprises microfabricating a plurality of microfluidic channels on the semiconductor material platform such that the plurality of microfluidic channels are in contact with the optical waveguide.

In some embodiments, microfabricating a plurality of microfluidic channels comprises microfabricating at least two microfluidic channels having different configurations.

Additional experimental results demonstrating the operation of further illustrative embodiments of the present invention will now be discussed with reference to FIGS. 21A, 21B, 22, 23 and 24.

In addition to the experimental results discussed above with reference to FIGS. 6 to 15, to further demonstrate the concept of nano-enhanced evanescence additional experiments were conducted in which nanoparticles were immobilized on the surface of an optical waveguide and evanescence measurements were carried out. Another motivation to perform these experiments was to demonstrate the concept of evanescence in the visible wavelength spectrum. Herein, the evanescence was measured using input light of 632 nm wavelength. Therefore, in order to facilitate the evanescence measurement for visible wavelength, suitable waveguides were fabricated that were capable of transmitting light at that wavelength. Herein, the waveguides were fabricated on SU8-on-Silica.

The waveguide system fabricated on the silicon base consists of an SU8 core with a cross-sectional area of 40×100 µm and a bottom cladding SU8 of lesser refractive index than the core. This is done by initially spin-coating of SU8 photoresist on Silica-on-silicon wafer, and after curing, another SU8 layer of 40 µm thickness was spun coated and lithography was carried out to obtain the waveguide core structures. The refractive indices of the bottom clad SU8 and the core was controlled by the pre-exposure baking time, it was found that increase in the pre-exposure baking time increased the refractive index [8]. Therefore, the core SU8 was baked for longer duration before UV exposure than the bottom clad. The thermally grown oxide layer on silicon acts as the second underclad layer to the SU8 waveguide system.

The feasibility of nano-enhanced evanescence is demonstrated by experimentation with Multi Walled Carbon Nanotubes (MWCNT). Initially, a CNT-water substrate was prepared, by the addition of 0.5 mg CNT (Walled Carbon Nanotube) with 1 mL of water. The CNTs remain suspended in water and do not dissolve to form a solution. CNT based NEET was studied in two different experiments, with water alone and secondly with CNT suspended in water.

Figure 21A:
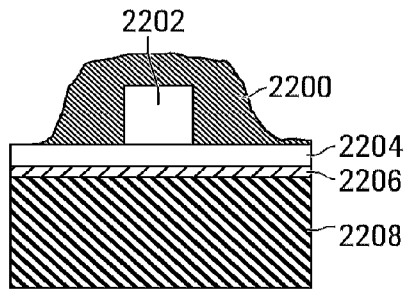
FIG. 21A is a cross-sectional view of an optical waveguide implemented on a Silica-on-Silicon (SOS) platform with the optical waveguide fabricated from SU8-on-Silica.

A cross-sectional schematic of the experimental setup is shown in FIG. 21A. FIG. 21A is a cross-sectional view of the experimental optical waveguide implemented on a Silica-on-Silicon (SOS) platform with the optical waveguide fabricated from SU8-on-Silica in accordance with the foregoing fabrication process with a CNT-water substrate applied to the optical waveguide. The optical waveguide includes an SU8 core 2202 with bottom clad SU8 2204 that if fabricated on underclad $SiO_2$ 2206 which is on top of handle layer silicon 2208. The CNT-water substrate is deposited on the waveguide and forms a CNT-water evanescent layer 2200.

Figure 21B:
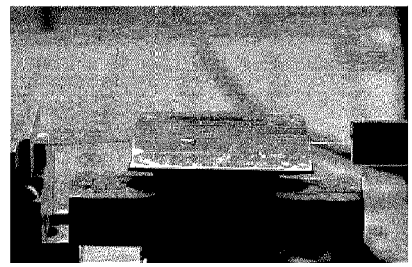
FIG. 21B is a photograph of an experimental setup with carbon nanotubes (CNTs) suspended in water deposited on a waveguide system corresponding to that shown in FIG. 21A.

A photograph of the experimental setup is shown in FIG. 21B.

Figure 22:
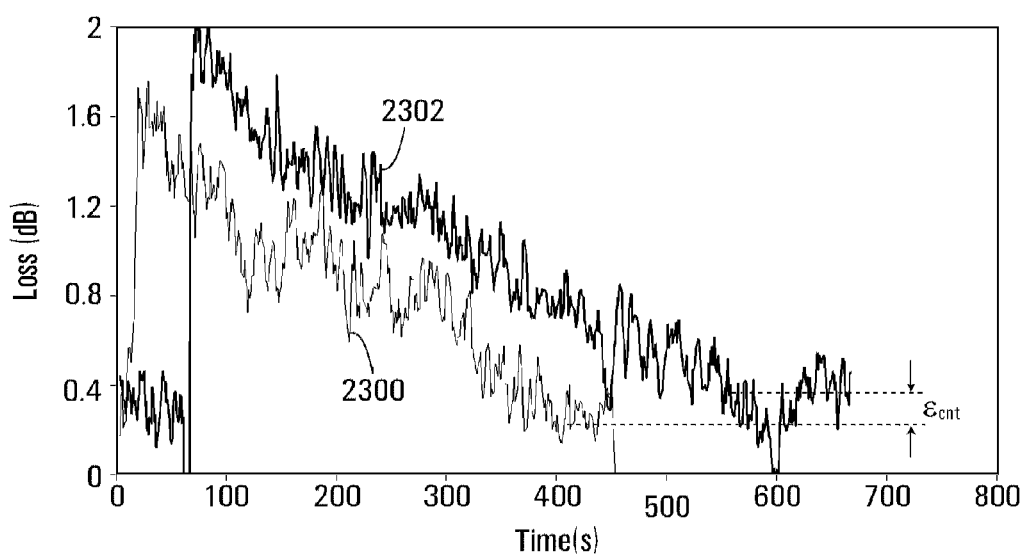
FIG. 22 is a plot of measurement results of evanescence loss with time for water and water+CNT for the experimental setup shown in FIG. 21B.

The results of evanescence measurements with water and water suspended with CNT for the experimental setup shown in FIGS. 21A and 21B are shown in FIG. 22, which gives the evanescent loss with time. In FIG. 22, the evanescence loss with time for the water suspended with CNT is shown as plotted results 2302, while the evanescence loss with time for the water is shown as plotted results 2300.

Figure 23:
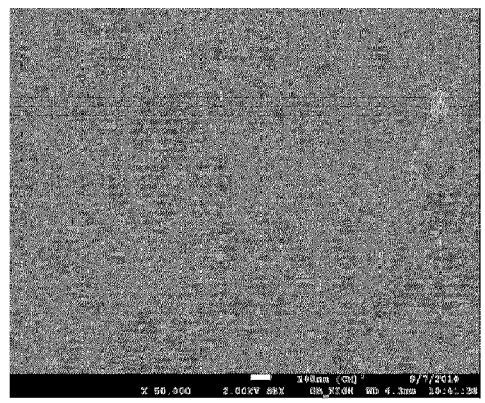
FIG. 23 is a photograph taken with a scanning electron microscope (SEM) of the CNT deposited on the waveguide of the experimental setup shown in FIG. 21B after evaporation of the water in which the CNT was suspended.

An increase in evanescent loss is observed immediately after the addition of the substrate on top of the waveguide. The subsequent reduction in the loss is due to the evaporation of the liquid from the waveguide surface. At the end of the evaporation of the liquid, the remnant loss is due to the immobilized CNT on the surface of the waveguide. The results of the evanescence test with water alone (shown as plotted results 2300), the total evanescent loss is the same as before the addition of the substrate. However, by the addition of CNT with water (shown as plotted results 2302), the evanescent loss is higher at the end of water evaporation. Also, the time taken for the evaporation of liquid from the waveguide surface is nearly equal for both the experiments. This shows that the total volume of the substrate added to the waveguide is the same in both cases. And hence, the increased evanescent loss is due to the addition of CNT with water. A photograph taken with a scanning electron microscope of the CNT deposited on the waveguide after water evaporation is shown in FIG. 23.

Figure 24:
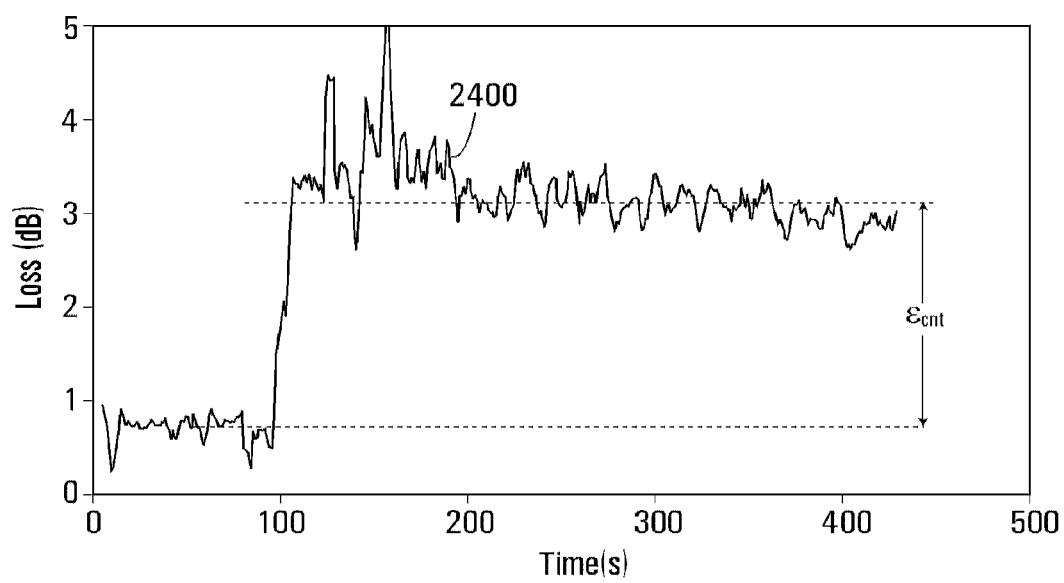
FIG. 24 is a plot of measurement results of evanescence loss with time for powder CNT deposited directly on top of the waveguide of the experimental setup shown in FIG. 21B.

In an additional test, powder CNT was directly deposited on top of the waveguide surface and the evanescent loss was measured. A plot of the evanescent loss with time 2400 for this test is as shown in FIG. 24. Here, the loss does not decrease with time after the addition of the nano features (MWCNT), thus proving that the decrease in evanescence with time is certainly due to the evaporation of liquid from the waveguide surface.

The results of the experiments with the CNT are summarized in Table 5. Here $\epsilon_{cnt}$ is the evanescence due to the NEET integration of the Carbon Nanotubes alone with the waveguide.

TABLE 5

Evanescent coefficient for the CNT enhanced evanescence tests carried out with SU8-on-silicon waveguide at 632 nm.

| Concentration of CNT | Evanescent loss due to CNT, $\epsilon_{cnt}$ (dB) | Evanescent coefficient ($cm^{-1}$) |
|---|---|---|
| 0.05~0.07 mg/mL | 0.2 | 0.23 |
| Pure CNT powder | 2.1 | 1.61 |

One can potentially modify the NEET based loss by increasing the evanescent length and concentration of the nano features.

It should be appreciated that the simulation and measurement results provided herein are provided for illustrative purposes only, and other simulations and/or measurements under the same or different conditions may result in the same or different results. The present invention is in no way limited to implementations in conjunction with a system or sensors that reflects the example simulation and/or measurement conditions described herein.

The foregoing description includes many detailed and specific embodiments that are provided by way of example only, and should not be construed as limiting the scope of the present invention. Alterations, modifications and variations may be effected to the particular embodiments by those of skill in the art without departing from the scope of the invention, which is defined solely by the claims appended hereto.

REFERENCES

Each of the following documents are hereby incorporated by reference in their entireties:
[1] Chandrasekaran, A., Packirisamy, M., 2005, "MOEMS based integrated microfluidic fiber-optic waveguides for Biophotonic applications" Proceedings of SPIE, vol. 5969, pp 178-186.
[2] Chandrasekaran, A., Packirisamy, M., Stiharu, I., Delage, A., 2006, "A hybrid micromachining technique suitable for roughness reduction in optical MEMS devices", *International Journal of Manufacturing Technology and Management*, vol. 9, n 1-2, pp 144-159.
[3] Haesun, K., B., and Harold V., W., 1989, "Elementary Steps in the Formation of Horseradish Peroxidase Compound I: Direct Observation of Compound 0, a new intermediate with a Hyperporphyrin Spectrum", *Biochemistry*, 28(57), pp 5714-5719.
[4] Masaru, A., Daisuke, T., Masami, K., Hideu, K., 2001, "Structural change and catalytic activity of Horseradish Peroxidase in oxidative polymerization of phenol", *Biosciences, Biotechnology and Biochemistry*, 65(7), pp 1581-1588.
[5] R-Soft FullWave v8.0, www.rsoftdesign.com
[6] *Micralyne Inc.*, 1911-94 Street, Edmonton, Alberta Canada T6N 1E6, http://www.micralyne.com.
[7] R-Soft BeamPROP v8.0, www.rsoftdesign.com
[8] B. H. Ong, X. Yuan and S. C. Tjin, "Adjustable refractive index modulation for a waveguide with SU-8 photoresist by dual-UV exposure lithography," *Appl. Opt.*, vol. 45, pp. 8036-8039, 2006.

The invention claimed is:

1. A device comprising:
an optical rib waveguide having a plurality of nanofeatures integrated thereon to influence at least one of evanescence and coupling of an optical field of the optical rib waveguide; and
a microfluidic channel in contact with at least one side of the optical rib waveguide.

2. The device of claim 1, wherein at least some of the plurality of nanofeatures have a different or same refractive index as that of any layer of the optical rib waveguide.

3. The device of claim 1, wherein the plurality of nanofeatures are formed such that they increase surface binding of bio-specimens on the optical rib waveguide.

4. The device of claim 1, wherein the optical rib waveguide is substantially transparent to light in the visible or infrared spectrum.

5. The device of claim 1, wherein the nanofeatures comprise at least one of: nanoparticles, nanopillars, nanocavities, nanotubes, nanorods, nanofilms, nanocolloids, nanostructures and nanospheres.

6. The device of claim 1, wherein the plurality of nanofeatures comprises at least one row of nanofeatures arranged substantially transverse to a direction of propagation of light through the optical rib waveguide.

7. The device of claim 6, wherein the at least one row of nanofeatures comprises a plurality of rows of nanofeatures, the plurality of rows being equally spaced or randomly distributed apart along a length of the optical rib waveguide.

8. The device of claim 1, wherein the optical rib waveguide comprises a first side wall, a second side wall opposite the first side wall and a top side wall joining the first side wall and the second side wall.

9. The device of claim 1, wherein the device is fabricated on Silicon, Silica, Silicon-On-Insulator (SOI), InP, GaAs, Poly dimethylsiloxane (PDMS), Poly Methyl Methacrylate (PMMA), SU8, other optical polymers and materials, or a combination thereof.

10. The device of claim 8, wherein each side of the optical rib waveguide in contact with the microfluidic channel has nanofeatures of the plurality of nanofeatures integrated thereon.

11. The device of claim 1, further comprising a seal top defining a bound of the microfluidic channel.

12. The device of claim 11, wherein the seal top comprises:
an inlet port for delivery of a sample specimen fluid into the microfluidic channel; and
an outlet port for removal of the sample specimen fluid from the microfluidic channel.

13. The device of claim 1, wherein the microfluidic channel comprises a plurality of microfluidic channels.

14. A sample analysis system comprising:
the device of claim 1; and
a fluidic actuation system for introducing sample specimen fluid into the microfluidic channel, wherein the fluidic actuation system comprises a pumping configuration including a mechanical or non-mechanical micropump or digital microfluidic system for fluid actuation.

15. A sample analysis system comprising:
the device of claim 1;
a fluidic actuation system for introducing sample specimen fluid into the microfluidic channel;
a light source for inputting light into an input end of the optical waveguide; and
a spectrum analyzer for determining an insertion loss of the optical waveguide.

16. A method of fabricating a device, the method comprising:
microfabricating an optical rib waveguide on a semiconductor material platform;
microfabricating a plurality of nanofeatures on at least one surface of the optical rib waveguide to influence at least one of evanescence and coupling of an optical field of the optical rib waveguide; and
microfabricating a microfluidic channel on the semiconductor material platform such that the microfluidic channel is in contact with the optical rib waveguide.

17. The method of claim 16, wherein microfabricating a plurality of nanofeatures on at least one surface of the optical rib waveguide comprises microfabricating at least some of the plurality of nanofeatures with a material having a different or same refractive index as that of any layer of the optical rib waveguide.

18. The method of claim 16, wherein microfabricating the optical rib waveguide comprises microfabricating the optical rib waveguide from a material that is substantially transparent to light in the visible or infrared spectrum.

19. The method of claim 16, wherein microfabricating a plurality of nanofeatures on at least one surface of the optical rib waveguide comprises microfabricating at least one of:

nanoparticles, nanopillars, nanocavities, nanotubes, nanorods, nanofilms, nanocolloids, nanostructures and nanospheres, on the at least one surface of the optical rib waveguide.

20. The method of claim 16, wherein microfabricating the optical rib waveguide comprises microfabricating the optical rib waveguide having a first side wall, a second side wall opposite the first side wall and a top side wall joining the first side wall and the second side wall.

* * * * *